US011785571B2

(12) United States Patent
Kumar et al.

(10) Patent No.: US 11,785,571 B2
(45) Date of Patent: Oct. 10, 2023

(54) USE OF EXISTING RRM MEASUREMENT GAP FOR PRS PROCESSING

(71) Applicant: QUALCOMM Incorporated, San Diego, CA (US)

(72) Inventors: Mukesh Kumar, Hyderabad (IN); Guttorm Ringstad Opshaug, Redwood City, CA (US); Pulkit Rajgadiya, Churu (IN); Fnu Siddhant, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 17/452,553

(22) Filed: Oct. 27, 2021

(65) Prior Publication Data

US 2023/0132286 A1    Apr. 27, 2023

(51) Int. Cl.
*H04W 64/00* (2009.01)
(52) U.S. Cl.
CPC .................................. *H04W 64/00* (2013.01)
(58) Field of Classification Search
None
See application file for complete search history.

(56) References Cited

U.S. PATENT DOCUMENTS

2018/0103474 A1\* 4/2018 Nurminen ................ H04W 8/22

FOREIGN PATENT DOCUMENTS

WO         2021167715 A1    8/2021

OTHER PUBLICATIONS

Huawei: "Discussion on PRS Measurement Outside the Management Gap", 3GPP TSG-RAN WG3 Meeting #114-e, R3-215377, 3rd Generation Partnership Project, Mobile Competence Centre, 650, Route Des Lucioles, F-06921 Sophia-Antipolis Cedex, France, vol. RAN WG3, No. E-meeting, Nov. 1, 2021-Nov. 11, 2021 Oct. 21, 2021, XP052068359, 2 Pages.
International Search Report and Written Opinion—PCT/US2022/041884—ISA/EPO—dated Dec. 16, 2022.
Oppo: "Discussion on Latency Reduction of Positioning Measurements", 3GPP TSG-RAN WG4 Meeting #101-e, R4-2118393, 3rd Generation Partnership Project, Mobile Competence Centre, 650, Route Des Lucioles, F-06921 Sophia-Antipolis Cedex, France, vol. Ran WG4, No. Electronic Meeting, Nov. 1, 2021-Nov. 12, 2021 Oct. 22, 2021, XP052069811, 4 Pages, section 2.2.

\* cited by examiner

*Primary Examiner* — Suhail Khan
(74) *Attorney, Agent, or Firm* — Procopio, Cory, Hargreaves & Savitch LLP/Qualcomm

(57)    ABSTRACT

A UE receives a first configuration for at least one RRM measurement gap. The UE receives one or more PRSs prior to the at least one RRM measurement gap. The UE identifies whether a processing availability of the UE during the at least one RRM measurement gap is sufficient to process the one or more PRSs. The UE processes the one or more PRSs, where in response to the processing availability of the UE during the at least one RRM measurement gap, the one or more PRSs are processed during the at least one RRM measurement gap; and in response to lack of the processing availability of the UE sufficient to process the one or more PRSs during the at least one RRM measurement gap, the one or more PRSs are processed, at least in part, outside of the at least one RRM measurement gap.

30 Claims, 21 Drawing Sheets

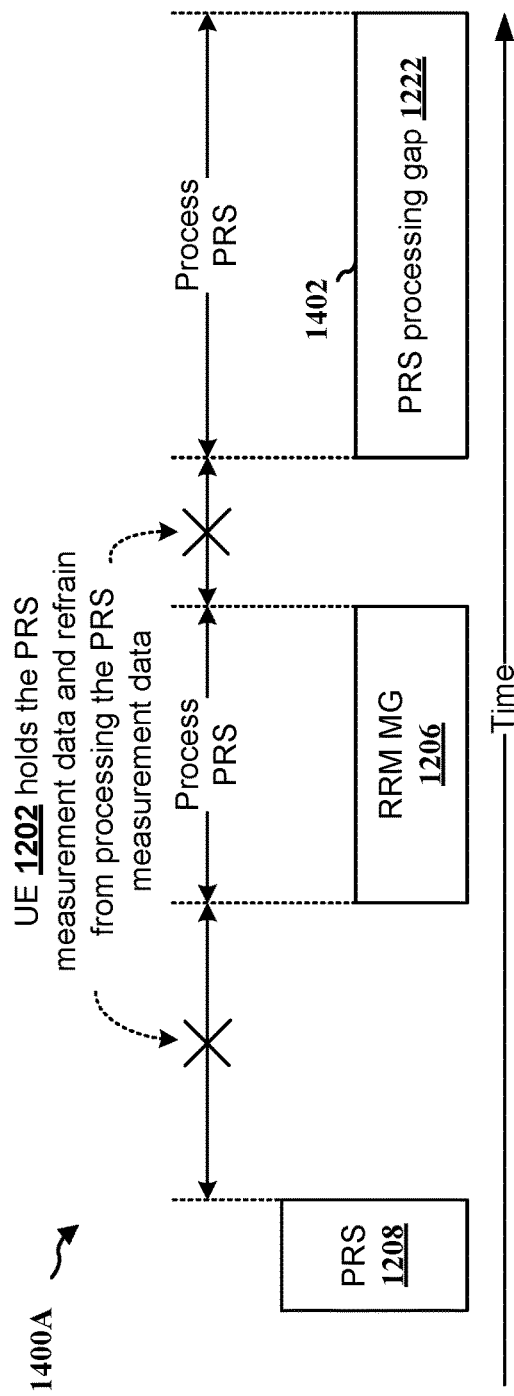
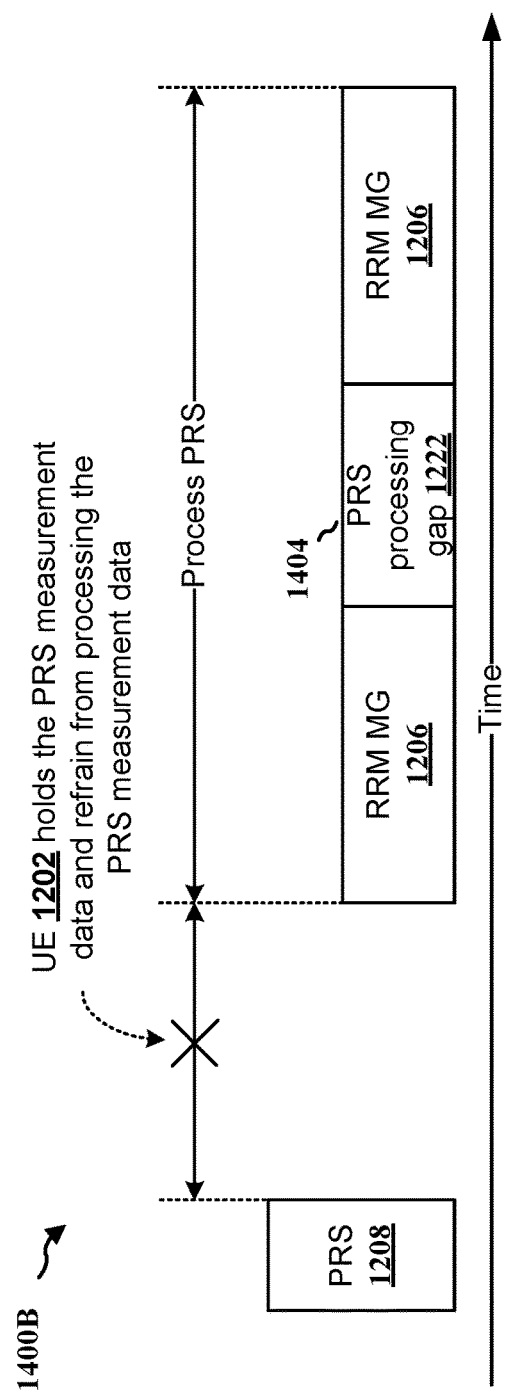
FIG. 14A
FIG. 14B

USE OF EXISTING RRM MEASUREMENT GAP FOR PRS PROCESSING

TECHNICAL FIELD

The present disclosure relates generally to communication systems, and more particularly, to wireless communications involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some communication system may also support a number of cellular network-based positioning technologies, where the geographic location of a wireless device may be determined based on measuring radio signals exchanged between the wireless device and other wireless devices. For example, a distance between a wireless device and a transmission reception point (TRP) may be estimated based on the time it takes for a reference signal (e.g., a positioning reference signal (PRS)) transmitted from the TRP to reach the wireless device. Other examples of cellular network-based positioning technologies may include downlink-based, uplink-based, and/or downlink-and-uplink-based positioning methods.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives a first configuration for at least one radio resource management (RRM) measurement gap. The apparatus receives one or more positioning reference signals (PRSs) prior to the at least one RRM measurement gap. The apparatus identifies whether a processing availability of the user equipment (UE) during the at least one RRM measurement gap is sufficient to process the one or more PRSs. The apparatus processes the one or more PRSs, wherein: in response to the processing availability of the UE during the at least one RRM measurement gap, the one or more PRSs are processed during the at least one RRM measurement gap; and in response to lack of the processing availability of the UE sufficient to process the one or more PRSs during the at least one RRM measurement gap, the one or more PRSs are processed, at least in part, outside of the at least one RRM measurement gap.

In another aspect of the disclosure, a method, a computer-readable medium, and an apparatus are provided. The apparatus transmits, to a UE, a first configuration for at least one RRM measurement gap. The apparatus transmits, to the UE, one or more PRSs prior to the at least one RRM measurement gap. The apparatus receives, from the UE, a request for at least one PRS processing gap based on the at least one RRM measurement gap being insufficient to process the one or more PRSs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 14A is a diagram illustrating an example of processing PRS measurement data within RRM measurement gaps and PRS processing gap in accordance with various aspects of the present disclosure.

FIG. 14B is a diagram illustrating an example of processing PRS measurement data within RRM measurement gaps and PRS processing gap in accordance with various aspects of the present disclosure.

DETAILED DESCRIPTION

Figure 1:
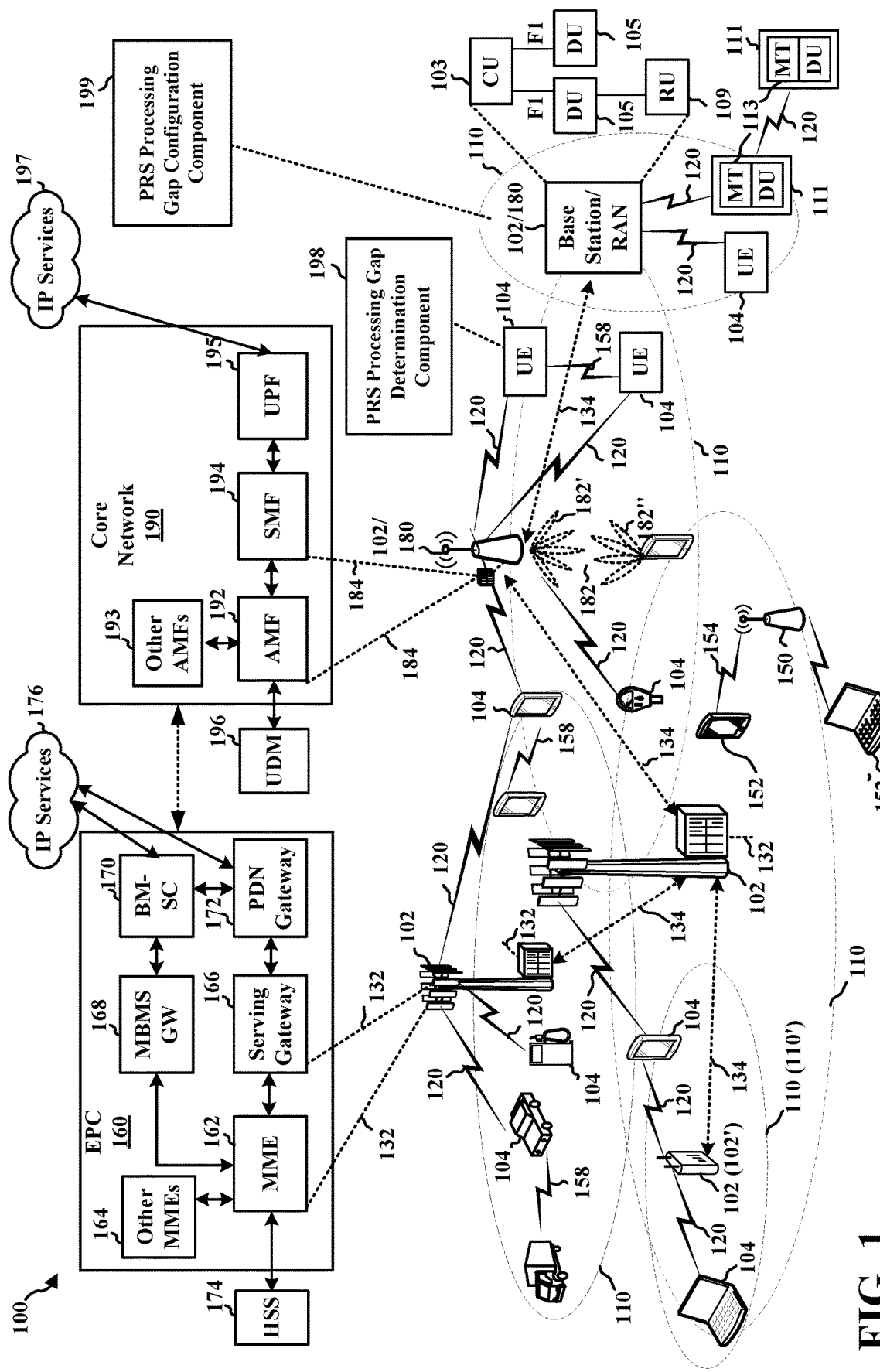
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may improve the performance and efficiency of a UE positioning session by reducing a number of PRS processing gaps requested by a UE. Aspects presented herein may enable a UE to utilize one or more RRM MGs to process a PRS based on one or more conditions, such that the UE may process the PRS without requesting a processing gap for the PRS from a serving base station.

In certain aspects, the UE 104 may include a PRS processing gap determination component 198 configured to process a PRS using one or more RRM MGs without requesting a processing gap for the PRS from a serving base station. In one configuration, the PRS processing gap determination component 198 may be configured to receive a first configuration for at least one RRM measurement gap. In such configuration, the PRS processing gap determination component 198 may receive one or more PRSs prior to the at least one RRM measurement gap. In such configuration, the PRS processing gap determination component 198 may identify whether a processing availability of the UE during the at least one RRM measurement gap is sufficient to process the one or more PRSs. In such configuration, the PRS processing gap determination component 198 may process the one or more PRSs, wherein: in response to the processing availability of the UE during the at least one RRM measurement gap, the one or more PRSs are processed during the at least one RRM measurement gap; and in response to lack of the processing availability of the UE sufficient to process the one or more PRSs during the at least one RRM measurement gap, the one or more PRSs are processed, at least in part, outside of the at least one RRM measurement gap.

In certain aspects, the base station 102/180 (or a TRP of the base station 102/180) may include a PRS processing gap configuration component 199 configured to provide at least one PRS processing gap to a UE based on the UE's request and/or based on whether the UE has a sufficient processing availability to process a PRS within one or more RRM MGs. In one configuration, the PRS processing gap configuration component 199 may be configured to transmit, to a UE, a first configuration for at least one RRM measurement gap. In such configuration, the PRS processing gap configuration component 199 may transmit, to the UE, one or more PRSs prior to the at least one RRM measurement gap. In such configuration, the PRS processing gap configuration component 199 may receive, from the UE, a request for at least one PRS processing gap based on the at least one RRM measurement gap being insufficient to process the one or more PRSs. In such configuration, the PRS processing gap configuration component 199 may transmit, to the UE, a second configuration for the at least one PRS processing gap based on the request.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central unit (CU) 103, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 103, the DU 105, and the RU 109. A RAN may be disaggregated with a split between the CU 103 and an aggregated DU/RU. The CU 103 and the one or more DUs 105 may be connected via an F1 interface. A DU 105 and an RU 109 may be connected via a fronthaul interface. A connection between the CU 103 and a DU 105 may be referred to as a midhaul, and a connection between a DU 105 and an RU 109 may be referred to as a fronthaul. The connection between the CU 103 and the core network may be referred to as the backhaul. The RAN may be based on a functional split between various components of the RAN, e.g., between the CU 103, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 103 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 103 and a DU 105. IAB nodes 111 may include a DU 105 and a mobile termination (MT) 113. The DU 105 of an IAB node 111 may operate as a parent node, and the MT 113 may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2A:
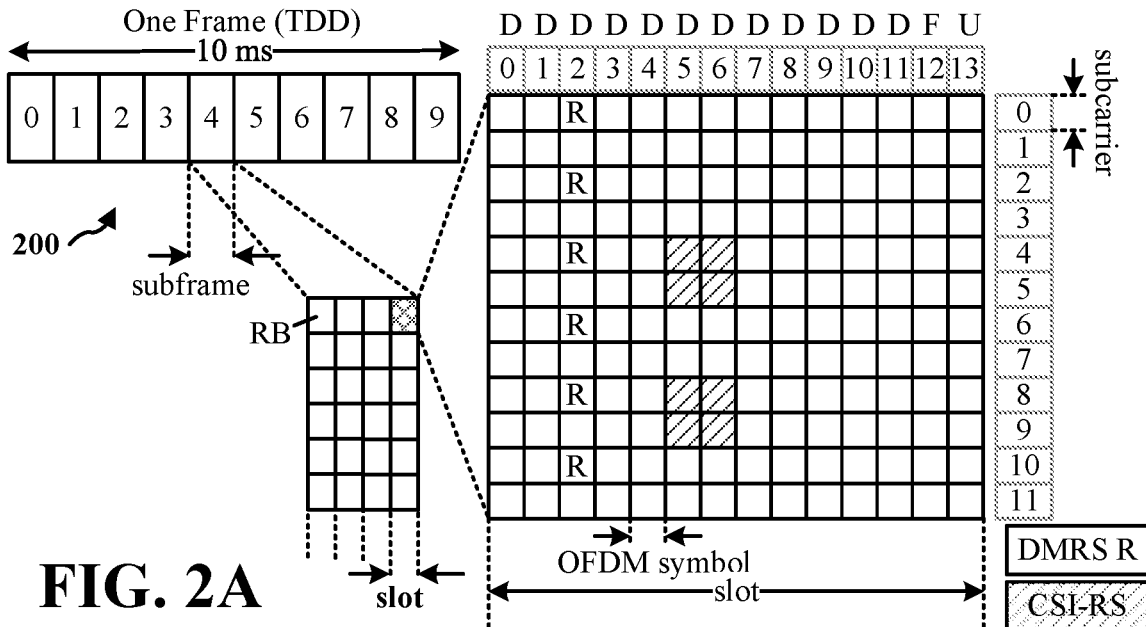
FIG. 2A is a diagram illustrating an example of a first frame, in accordance with various aspects of the present disclosure.
Figure 2B:
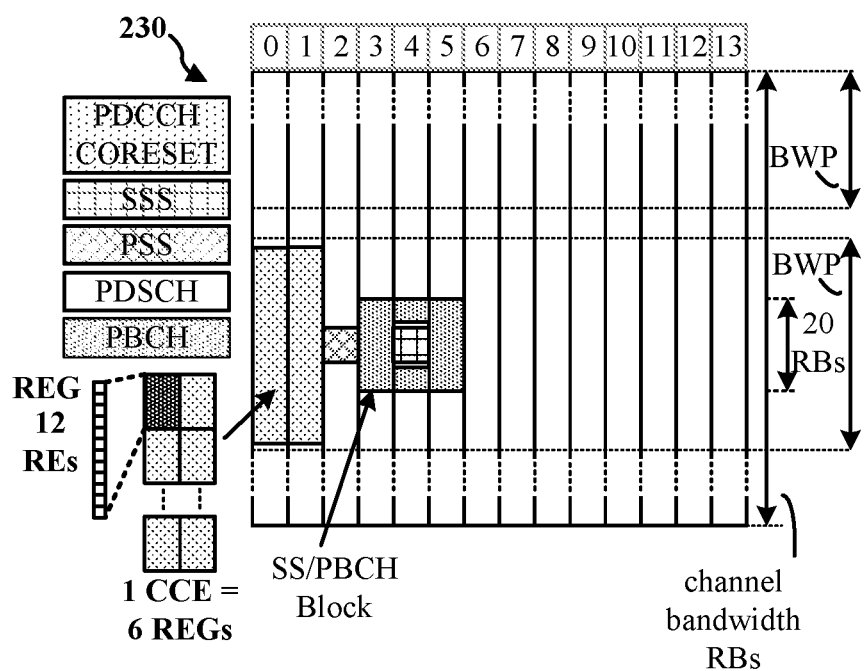
FIG. 2B is a diagram illustrating an example of DL channels within a subframe, in accordance with various aspects of the present disclosure.
Figure 2C:
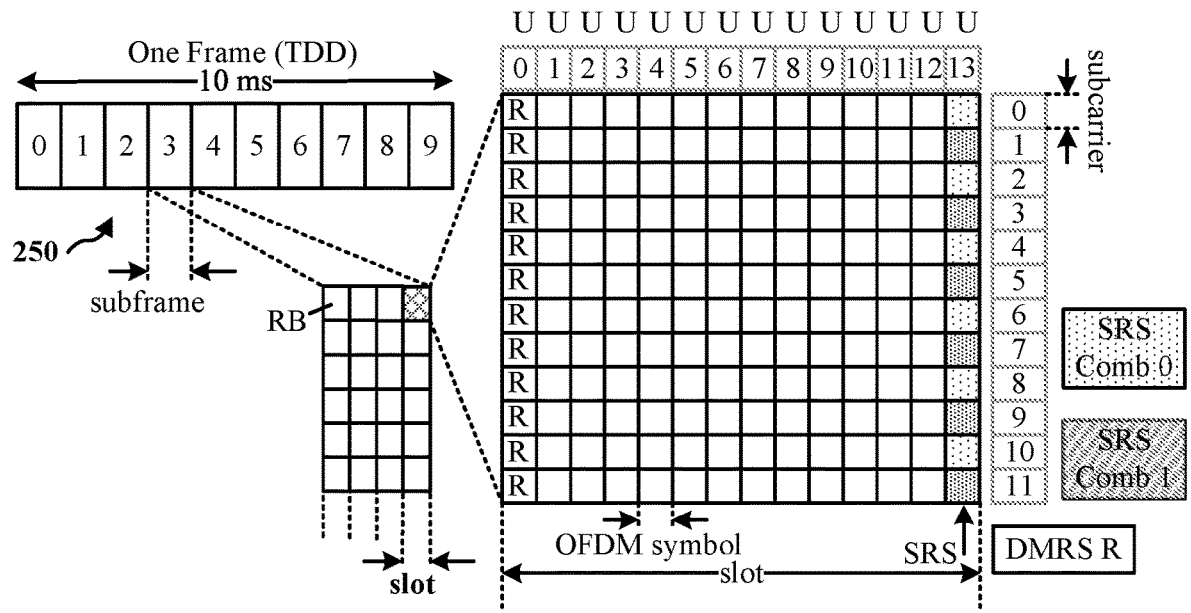
FIG. 2C is a diagram illustrating an example of a second frame, in accordance with various aspects of the present disclosure.
Figure 2D:
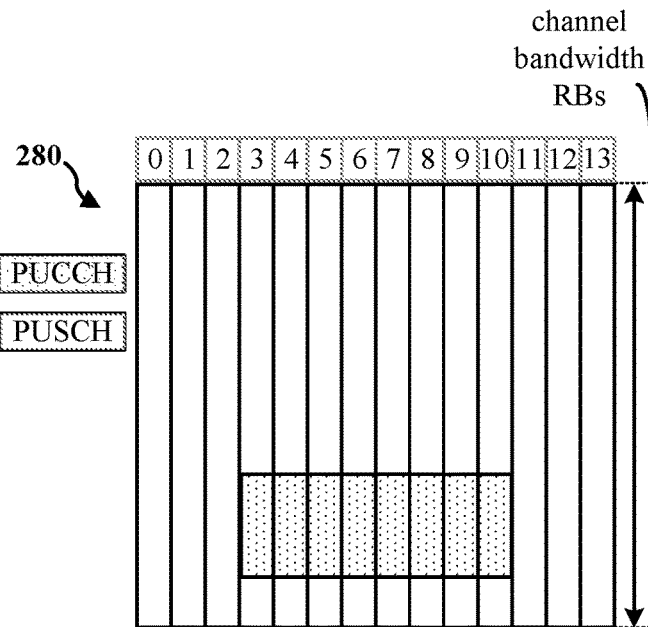
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
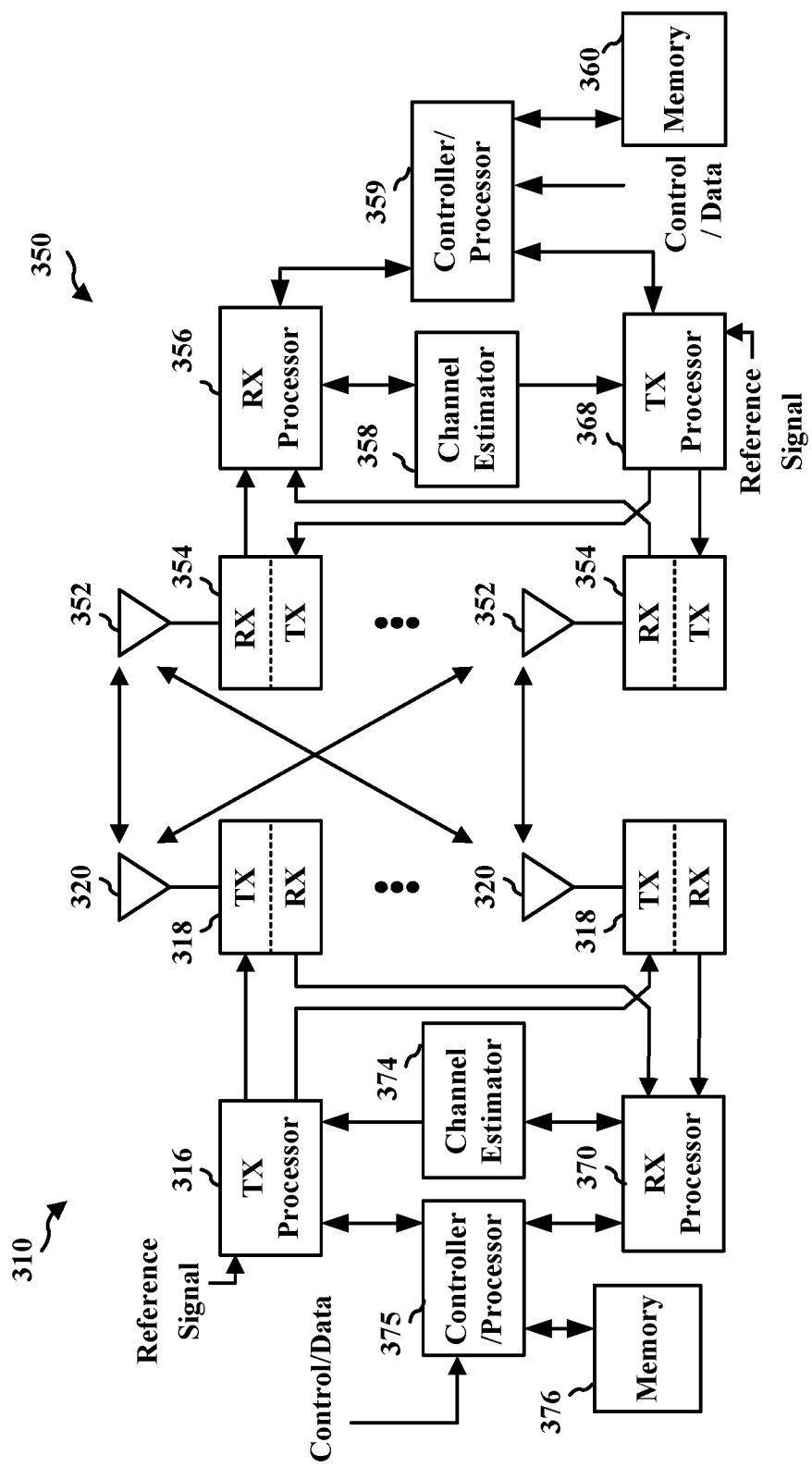
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PRS processing gap determination component 198 of FIG. 1.

At least one of the TX processor 316, the RX processor 370, and the controller/processor 375 may be configured to perform aspects in connection with the PRS processing gap configuration component 199 of FIG. 1.

A network may support a number of cellular network-based positioning technologies, such as downlink-based, uplink-based, and/or downlink-and-uplink-based positioning methods. Downlink-based positioning methods may include an observed time difference of arrival (OTDOA) (e.g., in LTE), a downlink time difference of arrival (DL-TDOA) (e.g., in NR), and/or a downlink angle-of-departure (DL-AoD) (e.g., in NR). In an OTDOA or DL-TDOA positioning procedure, a UE may measure the differences between each time of arrival (ToA) of reference signals (e.g., positioning reference signals (PRSs)) received from pairs of base stations, referred to as reference signal time difference (RSTD) measurements or time difference of arrival (TDOA) measurements, and report them to a positioning entity (e.g., a location management function (LMF)). For example, the UE may receive identifiers (IDs) of a reference base station (e.g., a serving base station) and multiple non-reference base stations in assistance data. The UE may then measure the RSTD between the reference base station and each of the non-reference base stations. Based on the known locations of the involved base stations and the RSTD measurements, the positioning entity can estimate a location of the UE. In other words, a position of the UE may be estimated based on measuring reference signals transmitted between the UE and one or more base stations and/or transmission-reception points (TRPs) of the one or more base stations. As such, the PRSs may enable UEs to detect and measure neighbor TRPs, and to perform positioning based on the measurement. For purposes of the present disclosure, the suffixes "-based" and "-assisted" may refer respectively to the node that is responsible for making the positioning calculation (and which may also provide measurements) and a node that provides measurements (but which may not make the positioning calculation). For example, an operation in which measurements are provided by a UE to a base station/positioning entity to be used in the computation of a position estimate may be described as "UE-assisted," "UE-assisted positioning," and/ or "UE-assisted position calculation" while an operation in which a UE computes its own position may be described as "UE-based," "UE-based positioning," and/or "UE-based position calculation."

In some examples, the term "TRP" may refer to one or more antennas of a base station whereas the term "base station" may refer to a complete unit (e.g., the base station 102/180) that includes aggregated or disaggregated components, such as described in connection with FIG. 1. For example, as an example of a disaggregated RAN, a base station may include CU, one or more DUs, one or more RUs, and/or one or more TRPs. One or more disaggregated components may be located at different locations. For example, different TRPs may be located at different geographic locations. In another example, a TRP may refer to a set of geographically co-located antennas (e.g. antenna array (with one or more antenna elements)) supporting transmission point (TP) and/or reception point (RP) functionality. Thus, a base station may transmit signal to and/or receive signal from other wireless device (e.g., a UE, another base station, etc.) via one or more TRPs. For purposes of the present disclosure, in some examples, the term "TRP" may be used interchangeably with the term "base station."

For DL-AoD positioning, the positioning entity may use a beam report from the UE of received signal strength measurements of multiple downlink transmit beams to determine the angle(s) between the UE and the transmitting base station(s). The positioning entity may then estimate the location of the UE based on the determined angle(s) and the known location(s) of the transmitting base station(s).

Uplink-based positioning methods may include UL-TDOA and UL-AoA. UL-TDOA is similar to DL-TDOA, but is based on uplink reference signals (e.g., sounding reference signals (SRSs)) transmitted by the UE. For UL-AoA positioning, one or more base stations may measure the received signal strength of one or more uplink reference signals (e.g., SRSs) received from a UE on one or more uplink receive beams. The positioning entity may use the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods may include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or a base station), which transmits an RTT response signal (e.g., an SRS or a PRS) back to the initiator. The RTT response signal may include the difference between the ToA of the RTT measurement signal and the transmission time of the RTT response signal, referred to as the reception-to-transmission (Rx-Tx) time difference. The initiator may calculate the difference between the transmission time of the RTT measurement signal and the ToA of the RTT response signal, referred to as the transmission-to-reception (Tx-Rx) time difference. The propagation time (also referred to as the "time of flight") between the initiator and the responder may be calculated from the Tx-Rx and Rx-Tx time differences. Based on the propagation time and the known speed of light, the distance between the initiator and the responder may be determined. For multi-RTT positioning, a UE may perform an RTT procedure with multiple base stations to enable its location to be determined (e.g., using multilateration) based on the known locations of the base stations. RTT and multi-RTT methods may be combined with other positioning techniques, such as UL-AoA and DL-AoD, to improve location accuracy.

The E-CID positioning method may be based on radio resource management (RRM) measurements. In E-CID, the UE may report the serving cell ID and the timing advance (TA), as well as the identifiers, estimated timing, and signal strength of detected neighbor base stations. The location of the UE is then estimated based on this information and the known locations of the base station(s).

To assist positioning operations, a location server (e.g., a location server, an LMF, or an SLP) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations (e.g., in periodically broadcasted overhead messages, etc.). In some cases, the UE may be able to detect neighbor network nodes without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may also be referred to as a position estimate, location, position, position fix, fix, or the like. A location estimate may be geodetic and include coordinates (e.g., latitude, longitude, and possibly altitude) or may be civic and include a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence). For purposes of the present disclosure, reference signals may include PRS, tracking reference signals (TRS), phase tracking reference signals (PTRS), cell-specific reference signals (CRS), CSI-RS, demodulation reference signals (DMRS), PSS, SSS, SSBs, SRS, etc., depending on whether the illustrated frame structure is used for uplink or downlink communication. In some examples, a collection of resource elements (REs) that are used for transmission of PRS may be referred to as a "PRS resource." The collection of resource elements may span multiple PRBs in the frequency domain and one or more consecutive symbol(s) within a slot in the time domain. In a given OFDM symbol in the time domain, a PRS resource may occupy consecutive PRBs in the frequency domain. In other examples, a "PRS resource set" may refer to a set of PRS resources used for the transmission of PRS signals, where each PRS resource may have a PRS resource ID. In addition, the PRS resources in a PRS resource set may be associated with a same TRP. A PRS resource set may be identified by a PRS resource set ID and may be associated with a particular TRP (e.g., identified by a TRP ID). In addition, the PRS resources in a PRS resource set may have a same periodicity, a common muting pattern configuration, and/or a same repetition factor across slots. The periodicity may be a time from a first repetition of a first PRS resource of a first PRS instance to the same first repetition of the same first PRS resource of the next PRS instance. For example, the periodicity may have a length selected from $2^\mu*\{4, 5, 8, 10, 16, 20, 32, 40, 64, 80, 160, 320, 640, 1280, 2560, 5120, 10240\}$ slots, where $\mu=0, 1, 2, 3$. The repetition factor may have a length selected from $\{1, 2, 4, 6, 8, 16, 32\}$ slots. A PRS resource ID in a PRS resource set may be associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." In some examples, a "PRS instance" or "PRS occasion" may be one instance of a periodically repeated time window (such as a group of one or more consecutive slots) where PRS are expected to be transmitted. A PRS occasion also may be referred to as a "PRS positioning occasion," a "PRS positioning instance," a "positioning occasion," "a positioning instance," a "positioning repetition," or simply an "occasion," an "instance," and/or a "repetition," etc.

A positioning frequency layer (PFL) (which may also be referred to as a "frequency layer") may be a collection of one or more PRS resource sets across one or more TRPs that have the same values for certain parameters. Specifically, the collection of PRS resource sets may have a same subcarrier spacing and cyclic prefix (CP) type (e.g., meaning all numerologies supported for PDSCHs are also supported for PRS), the same Point A, the same value of the downlink PRS bandwidth, the same start PRB (and center frequency), and/or the same comb-size, etc. The Point A parameter may take the value of a parameter ARFCN-ValueNR (where "ARFCN" stands for "absolute radio-frequency channel number") and may be an identifier/code that specifies a pair of physical radio channel used for transmission and reception. In some examples, a downlink PRS bandwidth may have a granularity of four PRBs, with a minimum of 24 PRBs and a maximum of 272 PRBs. In other examples, up to four frequency layers may be configured, and up to two PRS resource sets may be configured per TRP per frequency layer.

The concept of a frequency layer may be similar to a component carrier (CC) and a BWP, where CCs and BWPs may be used by one base station (or a macro cell base station and a small cell base station) to transmit data channels, while frequency layers may be used by multiple (e.g., three or more) base stations to transmit PRS. A UE may indicate the number of frequency layers it is capable of supporting when the UE sends the network its positioning capabilities, such as during a positioning protocol session. For example, a UE may indicate whether it is capable of supporting one or four PFLs.

Figure 4:
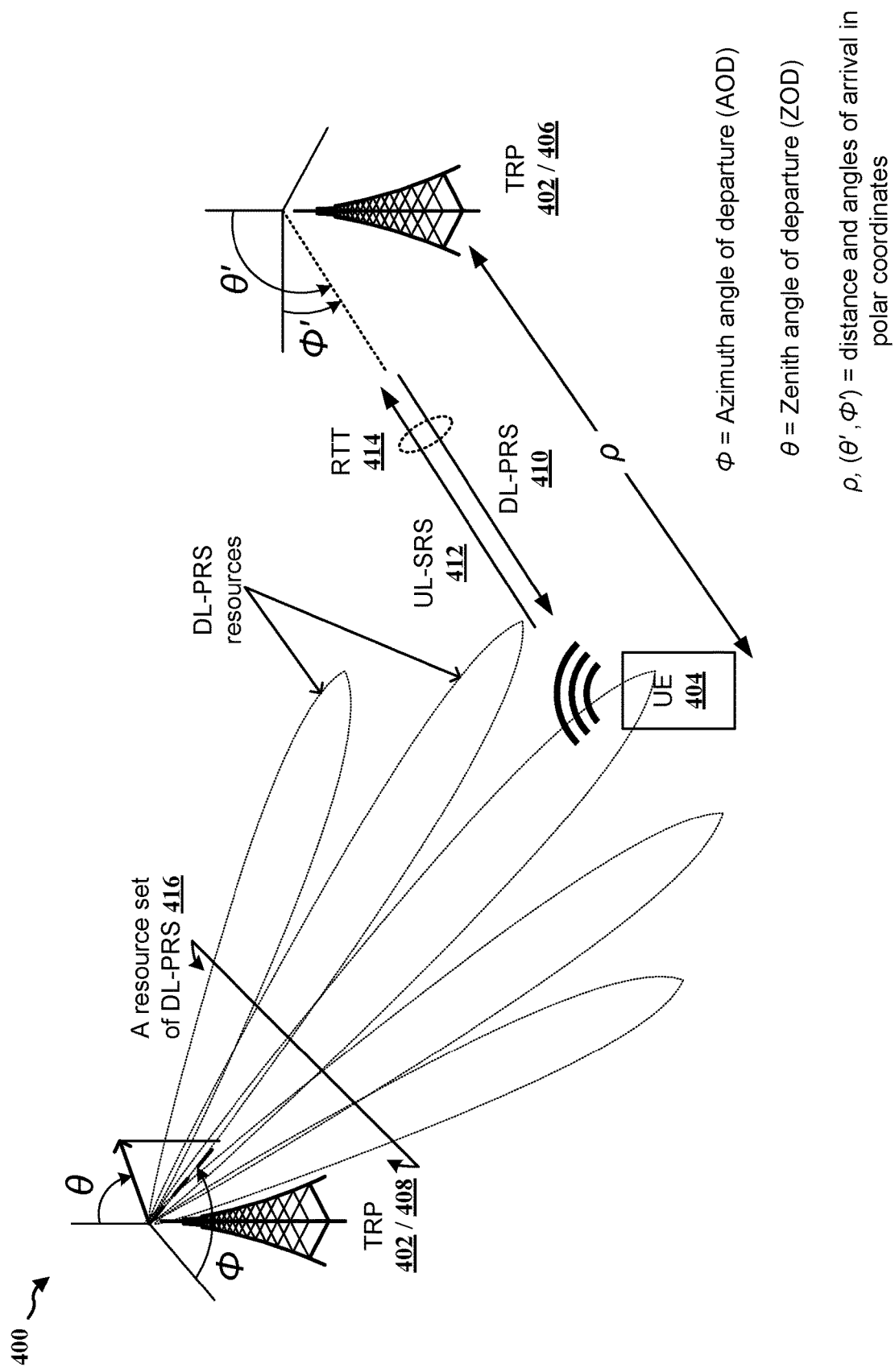
FIG. 4 is a diagram illustrating an example of a UE positioning based on reference signal measurements in accordance with various aspects of the present disclosure.

FIG. 4 is a diagram 400 illustrating an example of a UE positioning based on reference signal measurements in accordance with various aspects of the present disclosure. In one example, a location of UE 404 may be estimated based on multi-cell round trip time (multi-RTT) measurements, where multiple TRPs 402 may perform round trip time (RTT) measurements for signals transmitted to and received from the UE 404 to determine the approximate distance of UE 404 with respect to each of the multiple TRPs 402. Similarly, the UE 404 may perform RTT measurements for signals transmitted to and received from the TRPs 402 to determine the approximate distance of each TRP with respect to the UE 404. Then, based at least in part on the approximate distances of UE 404 with respect to the multiple TRPs 402, a location management function (LMF) that is associated with the TRPs 402 and/or the UE 404 may estimate the position of UE 404. For example, a TRP 406 may transmit at least one downlink positioning reference signal (DL-PRS) 410 to the UE 404, and may receive at least one uplink sounding reference signal (UL-SRS) 412 transmitted from the UE 404. Based at least in part on measuring an RTT 414 between the DL-PRS 410 transmitted and the UL-SRS 412 received, a serving base station associated with the TRP 406 or an LMF associated with the TRP 406 may identify the position of UE 404 (e.g., distance) with respect to the TRP 406. Similarly, the UE 404 may transmit UL-SRS 412 to the TRP 406, and may receive DL-PRS 410 transmitted from the TRP 406. Based at least in part on measuring the RTT 414 between the UL-SRS 412 transmitted and the DL-PRS 410 received, the UE 404 or an LMF associated with the UE 404 may identify the position of TRP 406 with respect to the UE 404. The multi-RTT measurement mechanism may be initiated by the LMF that is associated with the TRP 406/408 and/or the UE 404. A TRP may configure UL-SRS resources to a UE via radio resource control (RRC) signaling. In some examples, the UE and the TRP may report the multi-RTT measurements to the LMF, and the LMF may estimate the position of the UE based on the reported multi-RTT measurements.

In other examples, a position of a UE may be estimated based on multiple antenna beam measurements, where a downlink angle of departure (DL-AoD) and/or uplink angle of arrival (UL-AoA) of transmissions between a UE and one or more TRPs may be used to estimate the position of the UE and/or the distance of the UE with respect to each TRP. For example, referring back to FIG. 6, with regard to the DL-AoD, the UE 404 may perform reference signal received power (RSRP) measurements for a set of DL-PRS 416 transmitted from multiple transmitting beams (e.g., DL-PRS beams) of a TRP 408, and the UE 404 may provide the DL-PRS beam measurements to a serving base station (or to the LMF associated with the base station). Based on the DL-PRS beam measurements, the serving TRP or the LMF may derive the azimuth angle (e.g., Φ) of departure and the zenith angle (e.g., θ) of departure for DL-PRS beams of the TRP 408. Then, the serving TRP or the LMF may estimate the position of UE 404 with respect to the TRP 408 based on the azimuth angle of departure and the zenith angle of departure of the DL-PRS beams. Similarly, for the UL-AoA, a position of a UE may be estimated based on UL-SRS beam measurements measured at different TRPs, such as at the TRPs 402. Based on the UL-SRS beam measurements, a serving base station or an LMF associated with the serving base station may derive the azimuth angle of arrival and the zenith angle of arrival for UL-SRS beams from the UE, and the serving base station or the LMF may estimate the position of the UE and/or the UE distance with respect to each of the TRPs based on the azimuth angle of arrival and the zenith angle of arrival of the UL-SRS beams.

Figures 5A, 5B:
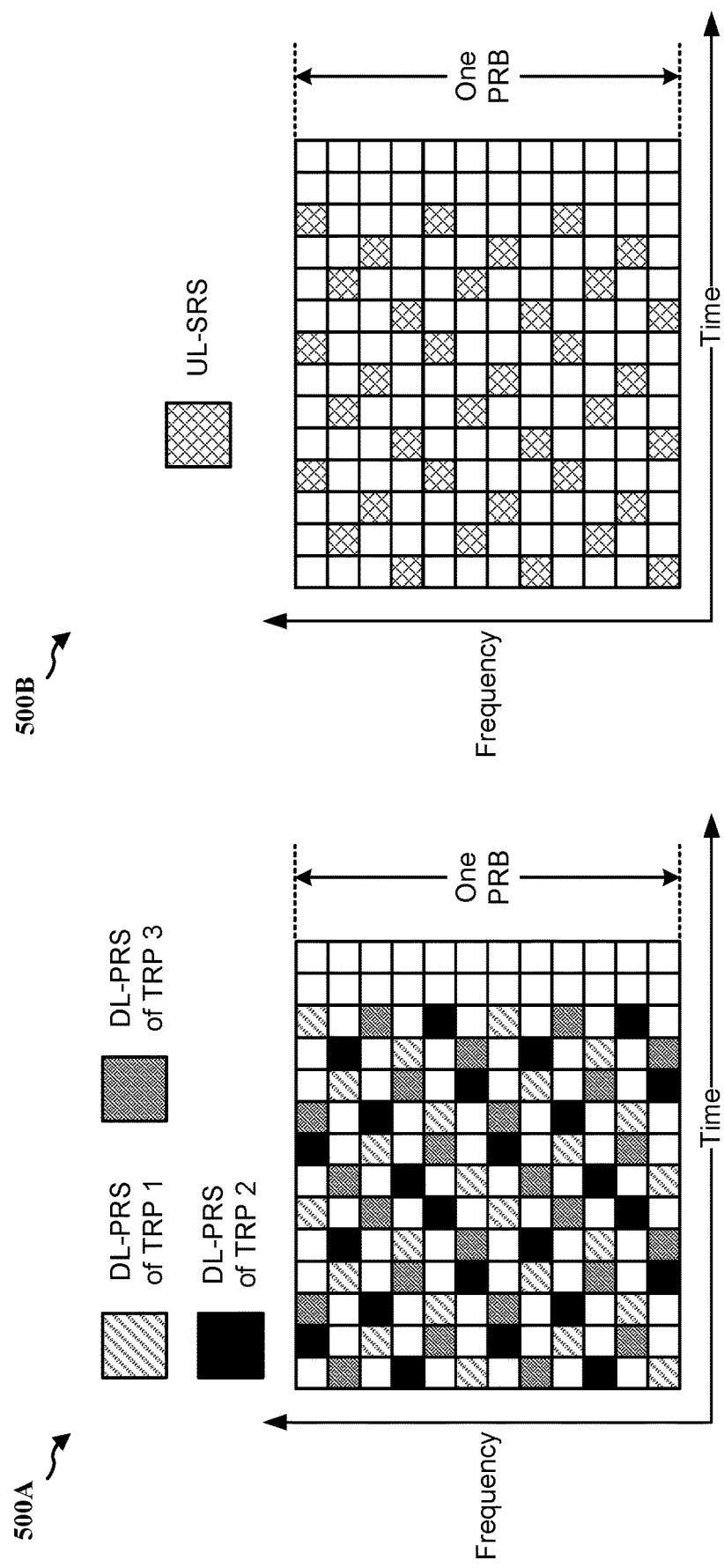
FIG. 5A is a diagram illustrating an example of downlink-positioning reference signal (DL-PRS) transmitted from multiple transmission-reception points (TRPs) in accordance with various aspects of the present disclosure.
FIG. 5B is a diagram illustrating an example of uplink-sounding reference signal (UL-SRS) transmitted from a UE in accordance with various aspects of the present disclosure.

FIG. 5A is a diagram 500A illustrating an example of DL-PRS transmitted from multiple TRPs in accordance with various aspects of the present disclosure. In one example, a serving base station may configure DL-PRS to be transmitted from one or more TRPs within a slot or across multiple slots. If the DL-PRS is configured to be transmitted within a slot, the serving base station may configure the starting resource element in time and frequency from each of the one or more TRPs. If the DL-PRS is configured to be transmitted across multiple slots, the serving base station may configure gaps between DL-PRS slots, periodicity of the DL-PRS, and/or density of the DL-PRS within a period. The serving base station may also configure the DL-PRS to start at any physical resource block (PRB) in the system bandwidth. In one example, the system bandwidth may range from 24 to 276 PRBs in steps of 4 PRBs (e.g., 24, 28, 32, 36, etc.). The serving base station may transmit the DL-PRS in PRS beams, where a PRS beam may be referred to as a "PRS resource" and a full set of PRS beams transmitted from a TRP on a same frequency may be referred to as a "PRS resource set" or a "resource set of PRS," such as described in connection with FIG. 4. As shown by FIG. 5A, the DL-PRS transmitted from different TRPs and/or from different PRS beams may be multiplexed across symbols or slots.

In some examples, each symbol of the DL-PRS may be configured with a comb-structure in frequency, where the DL-PRS from a TRP of a base station may occupy every $N^{th}$ subcarrier. The comb value N may be configured to be 2, 4, 6, or 12. The length of the PRS within one slot may be a multiple of N symbols and the position of the first symbol within a slot may be flexible as long as the slot consists of at least N PRS symbols. The diagram 500A shows an example of a comb-6 DL-PRS configuration, where the pattern for the DL-PRS from different TRPs may be repeated after six (6) symbols.

FIG. 5B is a diagram 500B illustrating an example of UL-SRS transmitted from a UE in accordance with various aspects of the present disclosure. In one example, the UL-SRS from a UE may be configured with a comb-4 pattern, where the pattern for UL-SRS may be repeated after four (4) symbols. Similarly, the UL-SRS may be configured in an SRS resource of an SRS resource set, where each SRS resource may correspond to an SRS beam, and the SRS resource sets may correspond to a collection of SRS resources (e.g., beams) configured for a TRP. In some examples, the SRS resources may span 1, 2, 4, 8, or 12 consecutive OFDM symbols. In other examples, the comb size for the UL-SRS may be configured to be 2, 4, or 8.

Figure 6:
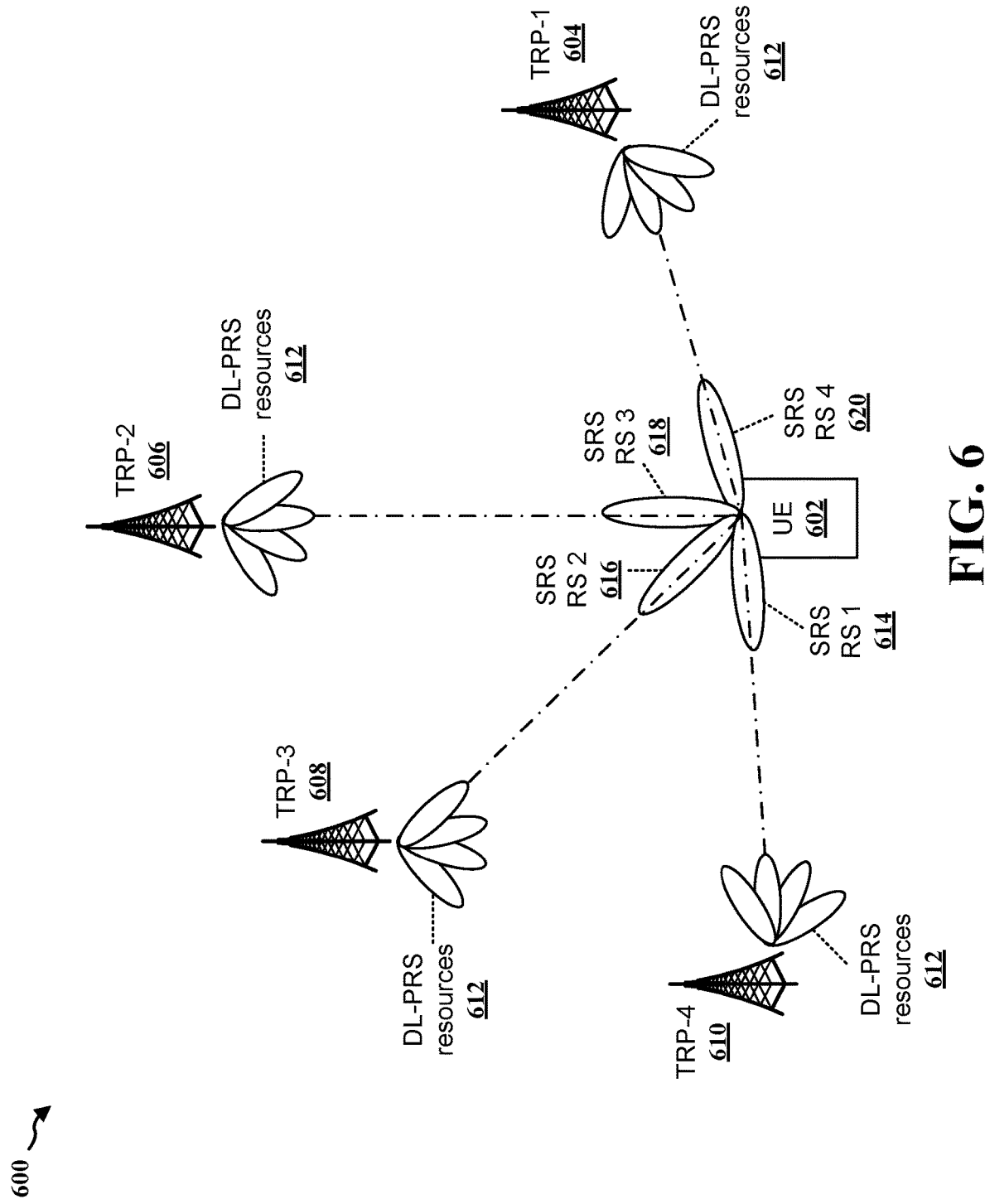
FIG. 6 is a diagram illustrating an example of estimating a position of a UE based on multi-round trip time (RTT) measurements from multiple TRPs in accordance with various aspects of the present disclosure.

FIG. 6 is a diagram 600 illustrating an example of estimating a position of a UE based on multi-RTT measurements from multiple TRPs in accordance with various aspects of the present disclosure. A UE 602 may be configured by a serving base station to decode DL-PRS resources 612 that correspond to and are transmitted from a first TRP 604 (TRP-1), a second TRP 606 (TRP-2), a third TRP 608 (TRP-3), and a fourth TRP 610 (TRP-4). The UE 602 may also be configured to transmit UL-SRSs on a set of UL-SRS resources, which may include a first SRS resource 614, a second SRS resource 616, a third SRS resource 618, and a fourth SRS resource 620, such that the serving cell(s), e.g., the first TRP 604, the second TRP 606, the third TRP 608, and the fourth TRP 610, and as well as other neighbor cell(s), may be able to measure the set of the UL-SRS resources transmitted from the UE 602. For multi-RTT measurements based on DL-PRS and UL-SRS, as there may be an association between a measurement of a UE for the DL-PRS and a measurement of a TRP for the UL-SRS, the smaller the gap is between the DL-PRS measurement of the UE and the UL-SRS transmission of the UE, the better the accuracy may be for estimating the position of the UE and/or the distance of the UE with respect to each TRP.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

In some scenarios, a UE may receive a plurality of PRS resources from multiple TRPs via one or more PFLs, where the UE may not have capabilities to process all of the plurality of PRS resources. As such, the UE may apply a predefined prioritization rule to prioritize measurements of PRS resources. Based on the predefined prioritization rule, the UE may measure a subset of the plurality of PRS resources, and the UE may skip measuring another subset of the plurality of PRS resources.

Figure 7:
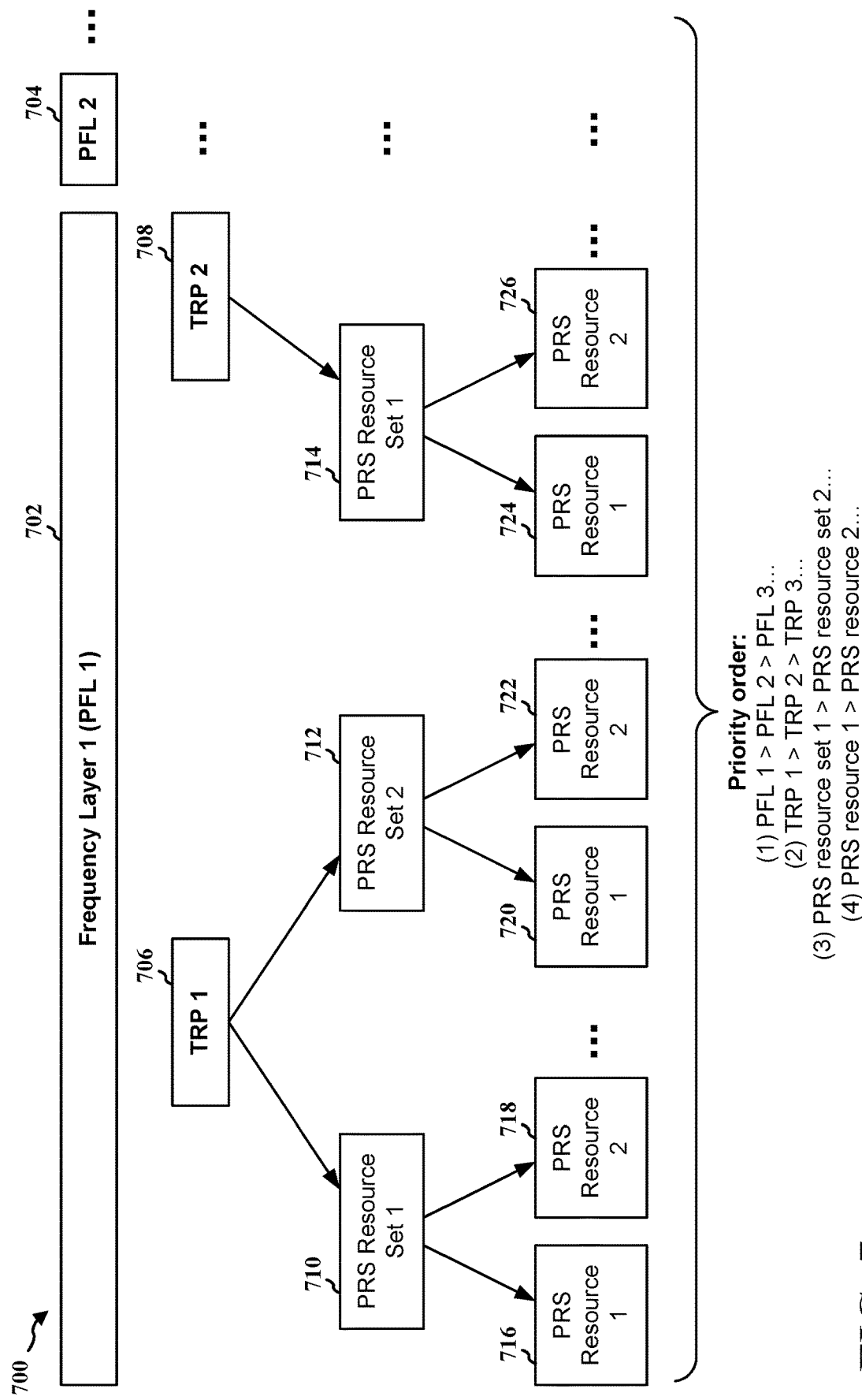
FIG. 7 is a diagram illustrating an example DL PRS resource prioritization in accordance with various aspects of the present disclosure.

FIG. 7 is a diagram 700 illustrating an example DL PRS resource prioritization in accordance with various aspects of the present disclosure. A UE may be configured with a number of PRS resources in an assistance data of a positioning session, where the number of PRSs resources to be process by the UE may be beyond the processing capability of the UE. In one example, the UE may assume the DL PRS resources in the assistance data are sorted in a decreasing order of measurement priority. For example, if the UE is configured to receive or measure the DL PRS resources via multiple frequency layers (e.g., PFLs), where each PFL may include PRS resources transmitted from multiple TRPs in, the UE may measure the DL PRS resources based on the priority associated with the multiple frequency layers (e.g., from a first frequency layer to a last frequency layer), based on the priority associated with the TRPs in each PFL (e.g., from a first TRP to a last TRP in a PFL), based on the priority associated with the RPS resource sets associated with each TRP (e.g., from a first PRS resource set to a last PRS resource set in a TRP), and based on the priority associated with the RPS resources within each PRS resource set (e.g., from a first PRS resource to a last PRS resource in a resource set), etc.

For example, as shown by the diagram 700, the UE may be configured to receive DL PRSs from a first frequency layer 702 (PFL 1) and a second frequency layer 704 (PFL 2). The first frequency layer 702 may include DL PRSs transmitted from a first TRP 706 and a second TRP 708, where the first TRP 706 may transmit PRSs using a first PRS resource 716 and a second PRS resource 718 in a first PRS resource set 710, and using a first PRS resource 720 and a second PRS resource 722 in a second PRS resource set 712, and the second TRP 708 may transmit PRSs using a first PRS resource 724 and a second PRS resource 726 in a first PRS resource set 714. Similarly, the UE may also receive DL PRSs from the second frequency layer 704 via multiple TRPs, PRS resource sets, and/or PRS resources.

In one example, if the UE does not have the capability to process all the configured PRS resources, the UE may be configured to receive or measure the PRSs received from the first frequency layer 702 first before processing PRSs in the second frequency layer 704. Similarly, if there are also a third frequency layer (PFL 3) and a fourth frequency layer (PFL 4), the UE may be configured to receive or measure the PRSs received from the first frequency layer 702 first, then the PRSs received from the second frequency layer 704, then the PRSs received from the third frequency layer, and then the PRSs received from the fourth frequency layer (e.g., PRSs are processed/measured based on PFL 1>PFL 2>PFL 3>PFL 4). If the UE does not have the capability to process/measure PRSs in a frequency layer, the UE may skip measuring the PRSs in that frequency layer. For example, if the UE is configured to receive the PRSs via the first frequency layer 702 and the second frequency layer 704 but the UE is just able to process/measure PRSs in the first frequency layer 702, the UE may skip PRS measurements for the second frequency layer 704.

Similarly, within a frequency layer, if the UE does not have the capability to process all the PRSs in the frequency layer, the UE may prioritize its PRS measurements based on the priorities associated with the TRPs. For example, the UE may be configured to receive or measure the PRSs received from the first TRP 706 before processing PRSs from the second TRP 708. Similarly, if there are also a third TRP (TRP 3) and a fourth TRP (TRP 4), the UE may be configured to receive or measure the PRSs received from the first TRP 706, then receive or measure the PRSs from the second TRP 708, then receive or measure the PRSs from the third TRP, and then receive or measure the PRSs from the fourth TRP (e.g., PRSs are processed/measured based on TRP 1>TRP 2>TRP 3>TRP 4 with a frequency layer). If the UE does not have the capability to process/measure PRSs from a TRP, the UE may skip measuring the PRSs in that TRP. For example, if the UE is configured to receive the PRSs via the first TRP 706 and the second TRP 708 via the first frequency layer 702 but the UE is just able to process/ measure PRSs in the first TRP 706, the UE may skip PRS measurements for the second TRP 708.

Furthermore, within a TRP, if the UE does not have the capability to process all the PRSs in that TRP, the UE may prioritize its PRS measurements based on the priorities associated with the PRS resource sets. For example, the UE may be configured to receive or measure the PRSs received from the first PRS resource set 710 first before processing PRSs from the second PRS resource set 712. Similarly, if there are also a third PRS resource set (PRS resource set 3) and a fourth PRS resource set (PRS resource set 4), the UE may be configured to receive or measure the PRSs received from the first PRS resource set 710 first, then the PRSs received from the second PRS resource set 712, then the PRSs received from the third PRS resource set, and then the PRSs received from the fourth PRS resource set (e.g., PRSs are processed/measured based on PRS resource set 1>PRS resource set 2>PRS resource set 3>PRS resource set 4 with a TRP). If the UE does not have the capability to process/ measure PRSs in a PRS resource set, the UE may skip measuring the PRSs in that PRS resource set. For example, if the UE is configured to receive the PRSs via the first PRS resource set 710 and the second PRS resource set 712 from the first TRP 706 but the UE is just able to process/measure PRSs in the first PRS resource set 710, the UE may skip PRS measurements for the second PRS resource set 712.

Lastly, within a PRS resource set, if the UE does not have the capability to process all the PRSs in that PRS resource set, the UE may prioritize its PRS measurements based on the priorities associated with the PRS resources. For example, the UE may be configured to receive or measure the PRSs received from the first PRS resource 716 first before processing PRSs from the second PRS resource 718. Similarly, if there are also a third PRS resource (PRS resource 3) and a fourth PRS resource (PRS resource 4), the UE may be configured to receive or measure the PRSs received from the first PRS resource 716 first, then the PRSs received from the second PRS resource 718, then the PRSs received from the third PRS resource, and then the PRSs received from the fourth PRS resource (e.g., PRSs are processed/measured based on PRS resource 1>PRS resource 2>PRS resource 3>PRS resource 4 with a PRS resource set). If the UE does not have the capability to process/measure PRSs in a PRS resource, the UE may skip measuring the PRSs in that PRS resource. For example, if the UE is configured to receive the PRSs via the first PRS resource 716 and the second PRS resource 718 of the first PRS resource set 710 but the UE is just able to process/measure PRSs in the first PRS resource 716, the UE may skip PRS measurements for the second PRS resource 718.

As such, if a UE is configured with multiple PRS resources via multiple frequency layers, multiple TRPs, multiple PRS resource sets, and/or multiple PRS resources, the UE may sort the frequency layers (e.g., may be up to four frequency layers) according to a priority, sort the TRPs per frequency layer (e.g., may be up to sixty four (64) TRPs per frequency layer) also according to a priority, sort the PRS resource sets per TRP (e.g., may be up to two resource sets per TRP) according to a priority, and/or sort the PRS resource per PRS resource set (e.g., may be up to sixty four (64) PRS resources per PRS resource set). In other words, within a positioning frequency layer, the DL PRS resources may be sorted in the decreasing order of priority for measurement to be performed by the UE, with the reference indicated by nr-DL-PRS-ReferenceInfo being the highest priority for measurement, and the following priority is assumed: (1) up to 64 dl-PRS-IDs of the frequency layer are sorted according to priority; and up to 2 DL PRS resource sets per dl-PRS-ID of the frequency layer are sorted according to priority.

In some examples, there may be measurement period specifications specified for PRS-RSTD, PRS-RSRP, and/or UE Rx-Tx time difference which may depend on various factors, such as a UE PRS processing capability and/or a number of samples, etc. In one example, a PRS-RSTD measurement period may be calculated based on the equation below (note similar equations may apply for PRS-RSRP and UE Rx-Tx time difference):

$$T_{RSTD,Total} = \sum_{i=1}^{L} T_{RSTD,i} + (L-1) * \max(T_{effect,i})$$

$$T_{RSTD,i} =$$

$$\left( CSSF_{PRS,i} * N_{RxBeam,i} * \left\lceil \frac{N_{PRS,i}^{slot}}{N_i} \right\rceil \left\lceil \frac{L_{available\_PRS,i}}{N_i} \right\rceil * N_{sample} - 1 \right) * T_{effect,i} +$$

$$T_{last}.$$

$$CSSF_{PRS,i} * N_{RxBeam,i} * \left\lceil \frac{N_{PRS,i}^{slot}}{N_i} \right\rceil \left\lceil \frac{L_{available\_PRS,i}}{N_i} \right\rceil * N_{sample}$$

may correspond to a total number of samples that are to be measured, where a sample may correspond to all the PRS resources within an effective period, denoted as $T_{effect,i}$. Further, for the last sample the UE may utilize $T_{last}=T_i+T_{available\_PRS,i}$, where $T_i$ may correspond to a reported UE capability related to PRS processing.

In one example, $CSSF_{PRS,i}$ may be a factor that is used to control how a measurement gap (MG) is being shared between positioning and mobility (radio resource management (RRM)) measurements. If the factor is one (1), it may indicate that there is no sharing of the MG instances between the positioning and the RRM measurements. $N_{rxbeam}$ may be an Rx beam sweeping factor. In some examples, the $N_{rxbeam}$ may equal to eight (8) for FR2 and $N_{rxbeam}$ may equal to (1) for FR1. The factor of eight (8) in the above formulation may be based on a conservative assumption that a UE may perform up to eight Rx beam sweeps across eight "group of instances/samples" assuming the UE is keeping a constant Rx beam within each "group of instances/samples $$", \left\lceil \frac{N_{PRS,i}^{slot}}{N_i} \right\rceil \left\lceil \frac{L_{available\_PRS,i}}{N_i} \right\rceil$$

may be factors that consider the PRS processing UE capability with regards to a current PFL configuration. In one example, if the capabilities of the UE are large enough, these factors may be one (1), and the factor may not contribute to the latency. $N_{sample}$ may be the number of samples/instances (e.g., for a PRS with periodicity of X ms, it may be assumed that at least $N_{sample}$ of periods are specified). $T_{effect,i}$ may correspond to an effective measurement periodicity (which is derived using the MGRP, $T_{PRS,i}$ and the reported capability $T_i$ of the UE). For example, $$T_{effect,i} = \left\lceil \frac{T_i}{T_{available\_PRS,i}} \right\rceil * T_{available\_PRS,i},$$

where $T_{available\_PRS,i}=LCM(T_{PRS,i}, MGRP_i)$, which may consider the alignment of the MG periodicity and the PRS periodicity. $T_{last}$ may be the measurement duration for the last PRS RSTD sample, which may include the sampling time and processing time $T_{last}=T_i+T_{available\_PRS,i}$.

If a measurement gap for PRS measurements is configured for a UE, a UE DL PRS processing capability may be defined for the UE. In one example, for the purpose of DL PRS processing capability, a duration K microsecond (ms) of DL PRS symbols within a P ms window corresponding to a maximum PRS periodicity in a positioning frequency layer may be calculated by: (1) Type 1 duration calculation with UE symbol level buffering capability, $K=\Sum_{s \in S} K_s$, and $K_s=T_s^{end}-T_s^{start}$; (2) Type 2 duration calculation with UE slot level buffering capability, $$K = \frac{1}{2^\mu} |S|,$$

where S may be a set of slots based on the numerology of the DL PRS of a serving cell within the P ms window in the positioning frequency layer that contains potential DL PRS resources considering the actual nr-DL-PRS-ExpectedRSTD, nr-DL-PRS-ExpectedRSTD-Uncertainty provided for each pair of DL PRS resource sets.

In one example, for Type 1 duration calculation, $[T_s^{start}, T_s^{end}]$ may be the smallest interval in ms within slot s corresponding to an integer number of OFDM symbols based on the numerology of the DL PRS of a serving cell that covers the union of the potential PRS symbols and determines the PRS symbol occupancy within slot s, where the interval $[T_s^{start}, T_s^{end}]$ may consider the actual nr-DL-PRS-ExpectedRSTD, nr-DL-PRS-ExpectedRSTD-Uncertainty provided for each pair of DL PRS resource sets (target and reference). In another example, for Type 2 duration calculation, μ may be the numerology of the DL PRS, and |S| may be the cardinality of the set S.

Figure 8:
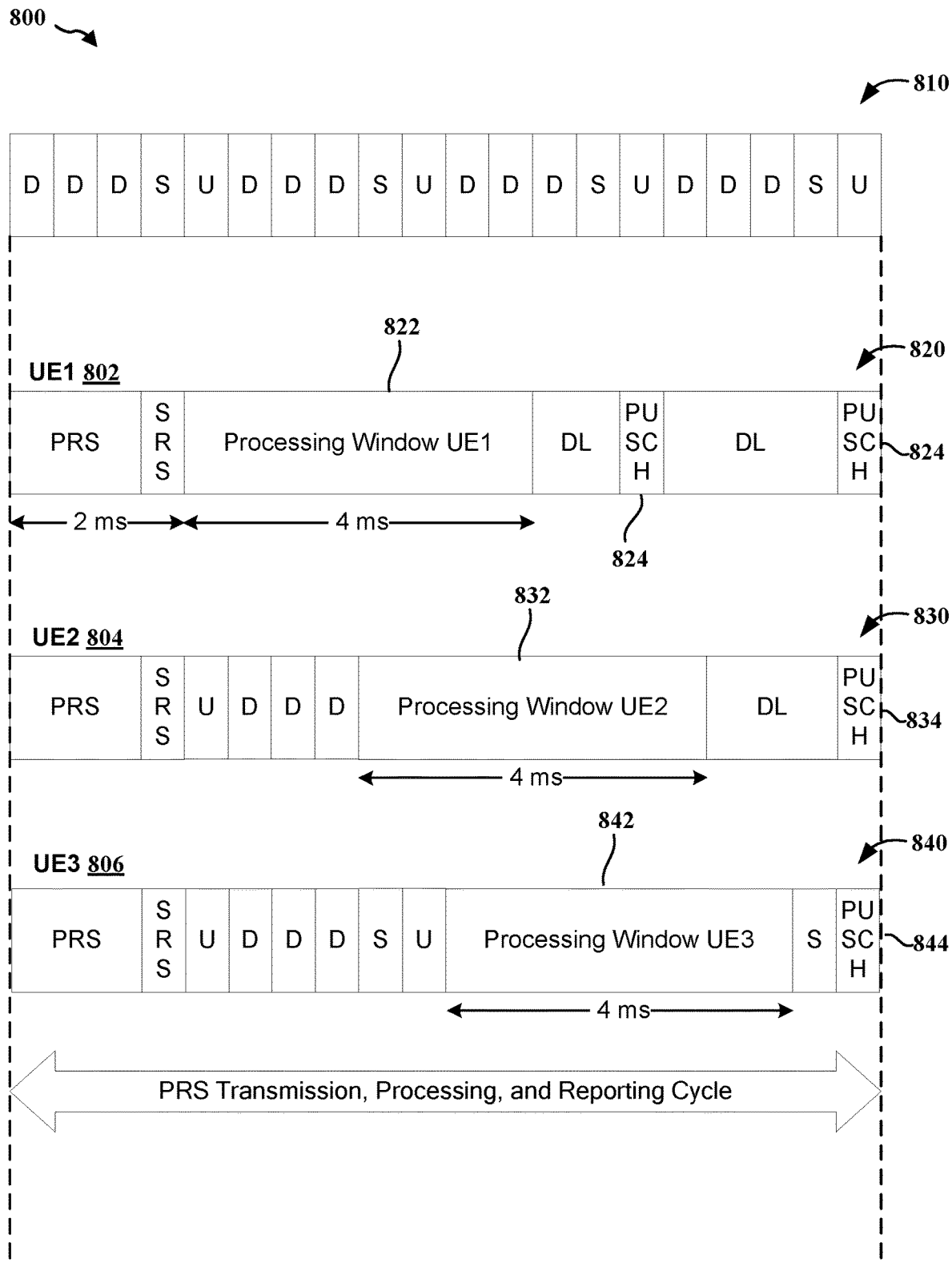
FIG. 8 is a diagram illustrating an example of DL-PRS transmission, processing, and reporting cycles for multiple UEs in accordance with various aspects of the present disclosure

FIG. 8 is a diagram 800 illustrating an example of DL-PRS transmission, processing, and reporting cycles for multiple UEs in accordance with various aspects of the present disclosure. A first UE 802 ("UE 1"), a second UE 804 ("UE 2"), and a third UE 806 ("UE 3") may be configured to use a "DDDSU" frame structure 810. In one example, the frame structure 810 may be configured with time-division duplex (TDD) 30 kHz SCS, where 30 kHz SCS (μ=1) may have 20 slots per frame and the slot duration may be 0.5 ms. Thus, each block of the DDDSU frame structure 810 may represent a 0.5 ms slot. The DDDSU frame structure 810 may include repetitions of three downlink (D) slots, a special (S) slot, and an uplink (U) slot.

In one example, the first UE 802, the second UE 804, and/or the third UE 806 may receive one or more PRSs in the first three downlink slots of a frame and transmit an SRS in the fourth slot. The PRS(s) and SRS may be received and transmitted, respectively, as part of a downlink-and-uplink-based positioning session, such as an RTT positioning session. The three slots in which the PRS are received (i.e., measured) may correspond to a PRS instance. In some examples, the PRS instance may be contained within a few milliseconds (e.g., 2 ms) of the start of the PRS transmission, processing, and reporting cycle. The SRS transmission (e.g., for a downlink-and-uplink-based positioning procedure) may be close to the PRS instance (e.g., in the next slot).

As shown by the diagram 800, the first UE 802 may be configured with a PRS transmission, processing, and reporting cycle 820, the second UE 804 may be configured with a PRS transmission, processing, and reporting cycle 830, and the third UE 806 may be configured with a PRS transmission, processing, and reporting cycle 840. The PRS transmission, processing, and reporting cycle 820, 830, and 840 may be repeated periodically (e.g., every 10 ms) for some duration of time. Each UE may be expected to send a positioning report (e.g., its respective Rx-Tx time difference measurement) at the end of its PRS transmission, processing, and reporting cycle (e.g., every 10 ms). Each UE may send its report on a PUSCH (e.g., a configured uplink grant). For example, the first UE 802 may send its report on a PUSCH 824, the second UE 804 may send its report on a PUSCH 834, and the third UE 806 may send its report on a PUSCH 844, etc.

In some scenarios, different UEs may be configured with their own PRS processing window (or simply "processing window"), or PRS processing gap (or simply "processing gap"), for processing the PRS measured in the first three slots of the frame (e.g., determine the ToA of the PRS and/or calculate the Rx-Tx time difference measurement, etc.). For example, the first UE 802 may be configured with a processing window 822, the second UE 804 may be configured with a processing window 832, and the third UE 806 may be configured with a processing window 842, etc. In this example, each processing window may be 4 ms in length.

In some examples, a processing window of each UE may be offset from the processing windows of other UEs, but may still within the 10 ms PRS transmission, processing, and reporting cycle of the UE. In addition, there may still be a PUSCH opportunity for reporting the measurements of the UE after the processing window. Even though there is a gap between the PRS instance and the processing window for the second UE 804 and the third UE 806, because of the short length of their respective PRS transmission, processing, and reporting cycles 830 and 840, there may be a limited aging between the measurement and the reporting.

A technical advantage of configuring the UEs with offset processing windows may be greater spectrum utilization. Rather than all of the UEs processing the PRS at the same time right after the PRS instance (and SRS transmission), and therefore not processing other signals, different UEs may continue to transmit and receive while other UEs do not.

In some examples, a processing window may be a time window after the time the one or more PRSs are received and measured by a UE. In other words, the processing window may be a period of time for a UE to process the PRS (e.g., to determine the ToA of the PRS for an Rx-Tx time difference measurement or an RSTD measurement) without having to measure any other signals. Thus, a processing window may also be referred to as a period of time during which the UE prioritizes PRS over other channels, which may include prioritization over data (e.g., PDSCH), control (e.g., PDCCH), and any other reference signals. There may, however, as shown in FIG. 8, be a gap between the time of the measurement and the processing window.

Figure 9:
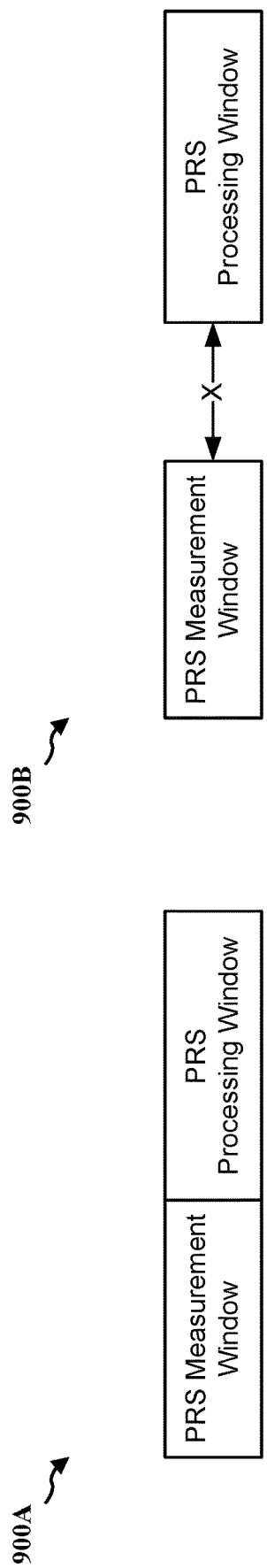
FIG. 9A is a diagram illustrating an example of measurement window and processing window in accordance with various aspects of the present disclosure.
FIG. 9B is a diagram illustrating an example of measurement window and processing window in accordance with various aspects of the present disclosure.

In one example, as shown by a diagram 900A of FIG. 9A, a processing window may be configured to be adjacent to a measurement window. In another example, as shown by a diagram 900B of FIG. 9B, there may be a gap between a processing window and a measurement window. A processing window, or a processing gap, may be different from a measurement window (or a "measurement gap"). In some examples, in a processing window, there may be no retune gaps as in a measurement gap. A retune gap may be referred to as a retune BWP gap in which a UE may use a retune gap for performing a BWP switching (e.g., switch from one BWP to another BWP). Thus, the UE may not change its BWP and instead continue with the BWP it had before the processing window. In addition, a location server (e.g., an LMF) may determine a processing window, and the UE may not specify a processing window to send an RRC request to the serving base station and wait for a reply. As such, processing windows may reduce the signaling overhead and the latency. Information related to a PRS processing window may be provided in the unicast assistance data the UE receives. A processing window may be associated with one or more PFLs, one or more PRS resource sets, one or more PRS resources, or any combination thereof.

In some examples, a UE may include a request for a specific processing window in an LPP Assistance Data Request message. Alternatively, the UE may include PRS processing window information in an LPP Provide Capabilities message. For example, a UE may include the processing window request for "tight" PRS processing cases (e.g., where there is limited time between the measured PRS instance and the measurement report). The request may include a length of time for a PRS processing window that the UE may need for the low-latency PRS processing applications. For example, the UE may need 4 ms of processing time for a PRS instance with 'X' PRS resources sets, resources, or symbols. The location server may use this recommendation to send assistance data to the UE that are associated to a specific PRS processing window.

The processing window information configured to the UE and/or recommended by the UE may include (1) an offset with respect to (a) the start of a PRS instance or offset (e.g., the processing window for the second UE 804 in FIG. 8 has an offset of 4 ms from the start of the PRS instance), (b) the end of a PRS instance (e.g., the processing window for the third UE 806 in FIG. 8 has an offset of 3.5 ms from the end of the PRS instance), (c) a PRS resource offset, (d) a PRS resource set offset, and/or (e) a slot, subframe, or frame boundary (e.g., the processing window for the second UE 804 in FIG. 8 has an offset of 4.5 ms from the start of the frame), (2) a length and/or an end time of the processing window, (3) whether the processing window is per UE, per band, per band combination (BC), per frequency range (e.g., FR1 or FR2), whether it affects LTE, and/or (4) how many PRS resources, resource sets, or instances can be processed within a processing window of such a length. In some cases, the location of the start/offset of the processing window may depend on the UE ID.

To configure a UE with a processing window, the location server (e.g., an LMF) may first send an on demand PRS configuration to the serving base station of the UE and a suggestion or recommendation or demand or request for a processing window for the UE. Note that the location server may not need to send the requested processing window at the same time as (e.g., in the same message) the on demand PRS configuration. Then, the serving base station may send a response to the location server. The response may be an acceptance of the requested processing window or a configuration of a different processing window. Then, the location server sends assistance data to the UE for the positioning session. The assistance data includes the PRS configurations and the associated processing window.

In some cases, a UE may utilize autonomous processing windows (i.e., autonomous PRS prioritization). In such cases, after a PRS instance, if there is no measurement gap configured, the UE may drop or disregard all other traffic for some period of time without notifying the serving base station. In an aspect, there may be a maximum window inside which the UE is permitted to perform these autonomous PRS prioritizations. As one example, the UE may be expected to finish PRS processing within 'X' ms (e.g., 6 ms) after the end of the PRS instance, and inside that 'X' ms, the UE may select a period of 'Y' ms (where 'Y' less than 'X,' e.g., 4 ms) during which the UE autonomously prioritizes PRS over other channels. It will be up to the UE to drop or disregard any other channels and processes (e.g., CSI processes) during this window—the serving base station will not refrain from transmitting to the UE.

A UE may be configured to measure one or more neighboring cells, signals, and/or other carrier components from time to time. For example, a UE may measure signal transmitted from a neighbor cell while communicating with a serving cell. In some scenarios, if the neighbor cell and the serving cell are operating at different frequencies and/or are based on different radio access technologies (RATs), the UE may be specified to suspend the communication (e.g., Tx/Rx) with the serving cell to retune its RF module to adopt a different frequency and/or RAT, and the UE may resume the connection with the serving cell after a time duration.

Figure 10:
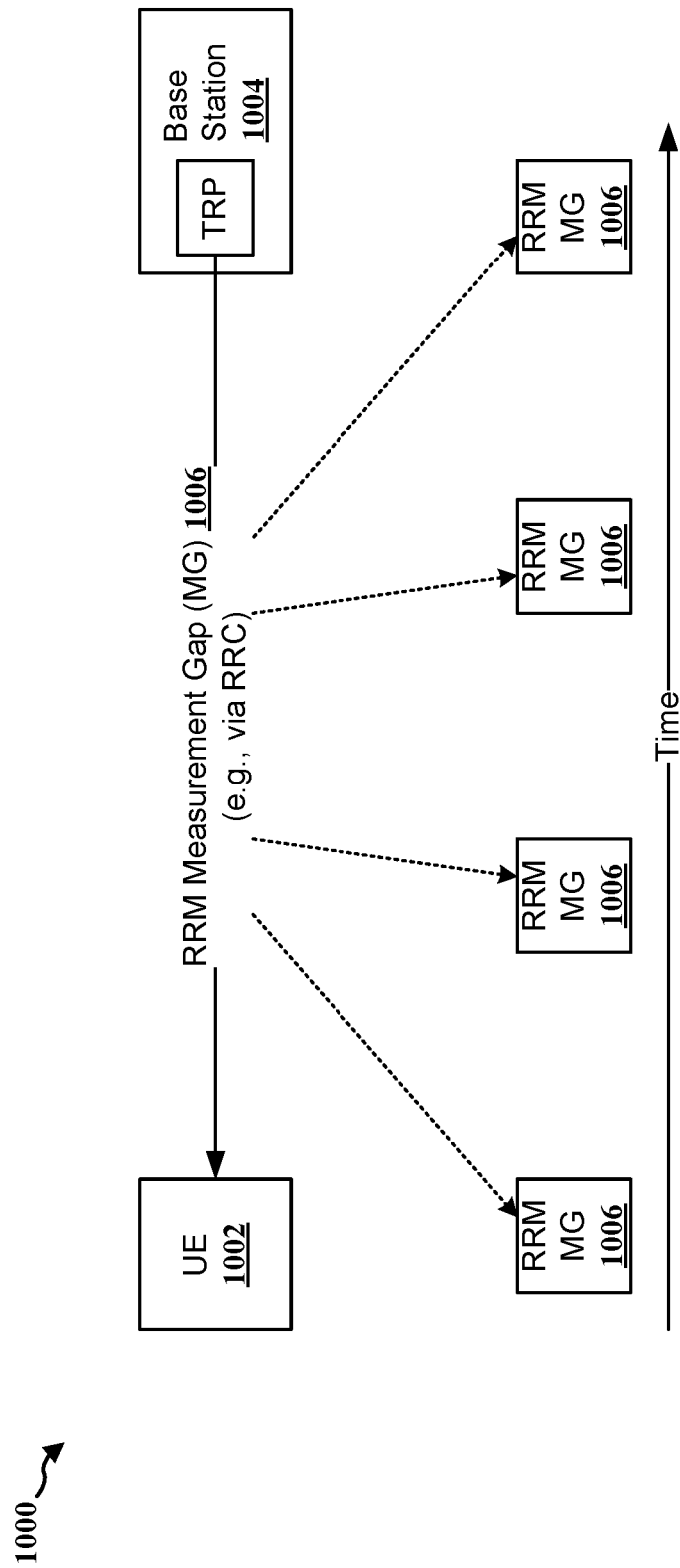
FIG. 10 is a diagram illustrating an example radio resource management (RRM) measurement gap in accordance with various aspects of the present disclosure.

In some examples, the time duration in which the UE suspends its communication with the serving cell (e.g., to measure inter frequency neighbor and/or other RAT neighbor) may be referred to as a radio resource management (RRM) measurement gap (MG). FIG. 10 is a diagram 1000 illustrating an example RRM measurement gap in accordance with various aspects of the present disclosure. A UE 1002 may receive a configuration for one or more RRM MGs 1006 (or an RRM MG pattern configuration for the one or more RRM MGs 1006) from a base station 1004, where the UE 1002 may use the one or more RRM MGs 1006 to retune its RF module to adopt to different frequencies and/or RATs, etc. For some networks (e.g., the LTE), the length for each of the one or more RRM MGs 1006 may be fixed, such that at least one synchronization signal (e.g., PSS and/or SSS) may be included within one RRM MG. For example, if a synchronization signal is transmitted at a five (5) ms periodicity, the length for each of the one or more RRM MGs 1006 may be configured to be six (6) ms, allowing 0.5 ms for RF module re-tuning at the beginning and end of the RRM MG. For some other networks (e.g., the 5G NR), the length for each of the one or more RRM MGs 1006 may be configurable/flexible. For example, the length of an RRM MG may be 1.5 ms, 3 ms, 3.5 ms, 4 ms, 5.5 ms, or 6 ms, etc., and the repetition period between RRM MGs in the one or more RRM MGs 1006 may be 20 ms, 40 ms, 80 ms, and/or 160 ms, etc. The base station 1004 may configure an RRM MG pattern for the UE 1002 via RRC signaling, such as by using a MeasGapConfig information element (IE) within the MeasConfig IE of an RRC. The configuration may include two parts, where a first part may specify control setup/release of the RRM MG and a second part may specify RRM MG configuration and controls setup/release.

Figure 11:
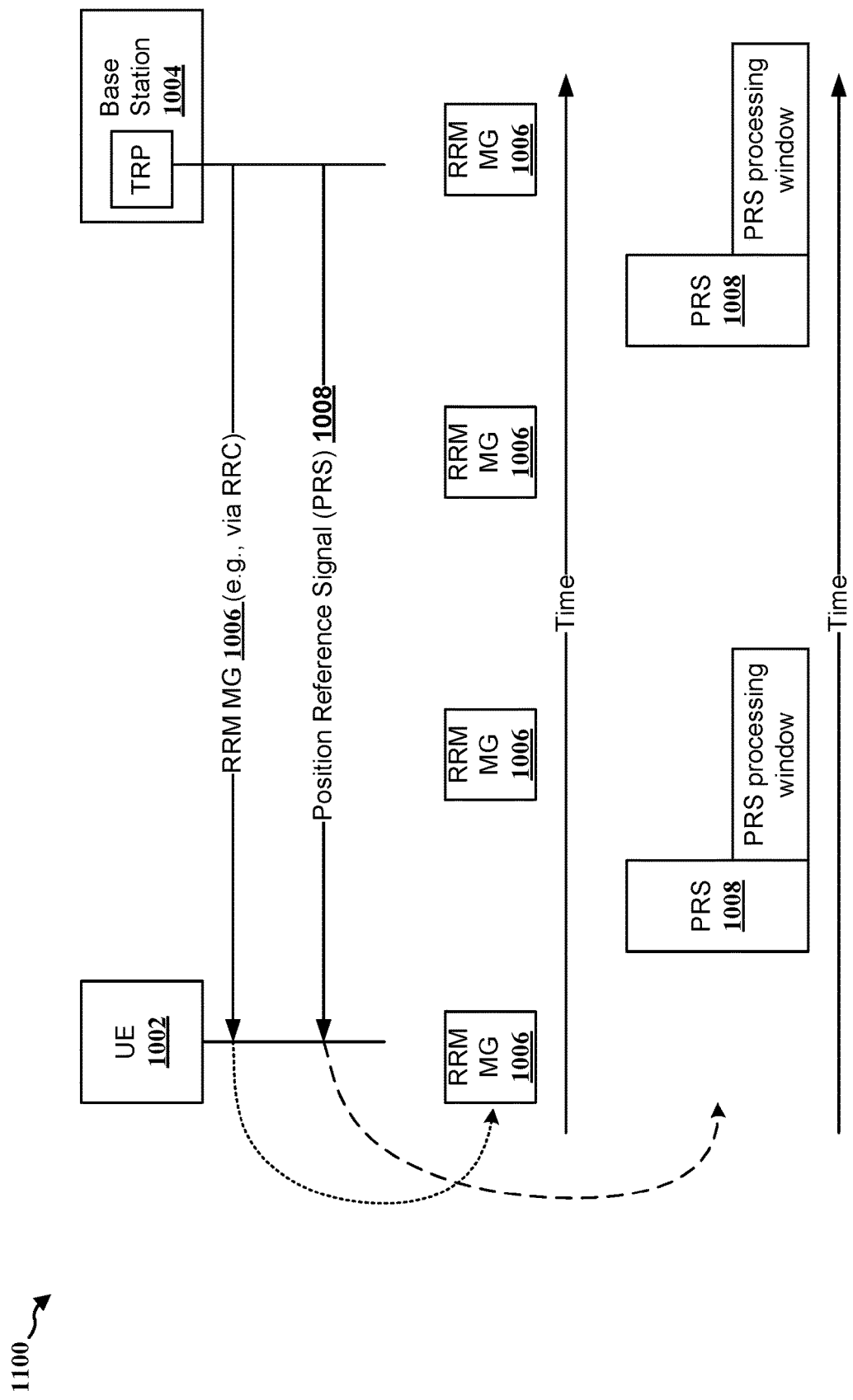
FIG. 11 is a diagram illustrating an example of RRM measurement gaps and PRS processing in accordance with various aspects of the present disclosure.

In some scenarios, as shown by a diagram 1100 of FIG. 11, if the UE 1002 receives an assistance data (AD) for positioning, the base station 1004 may transmit one or more PRSs 1008 to the UE 1002 for the UE 1002 to measure and process (e.g., to measure DL RSTD, DL PRS RSRP, and/or UE Rx-Tx time difference, etc.). In some examples, the UE 1002 may already be configured by the base station 1004 with the one or more RRM MGs 1006 (e.g., via RRC), where the UE 1002 may be aware of the RRM MG scheduling as well as the utilization of the RRM MG. As such, the UE 1002 may also be aware of an amount (e.g., a percentage) of processing available for the one or more RRM MGs 1006 based on measurement object(s) configured for the one or more RRM MGs 1006. In addition, the UE 1002 may further be aware of PRS processing utilization and/or its PRS processing capability (e.g., the amount of time and/or resources for processing the PRS). In some examples, an RRM MG scheduling may be higher compared to a PRS periodicity. For example, an RRM MG may have a period of 40 and 80 ms, whereas the PRS periodicity may be in an order of 160 ms, 320 ms, or more.

Aspects presented herein may improve the performance and efficiency of a UE positioning session by reducing a number of PRS processing gaps requested by a UE. Aspects presented herein may enable a UE to utilize one or more RRM MGs to process a PRS based on one or more conditions, such that the UE may process the PRS without requesting a processing gap for the PRS from a serving base station.

In one aspect of the present disclosure, based at least in part on a percentage or an amount of UE processing available in one or more RRM MGs, a UE may determine whether there is a sufficient processing availability in the one or more RRM MGs to process one or more PRSs received from a base station (e.g., based on the processing specified for PRS measurements). Then, if the UE determines that the processing availability in the one or more RRM MGs is sufficient to process the one or more PRSs, the UE may process the one or more PRSs during the one or more RRM MGs. In addition, the UE may be refrained from processing the one or more PRSs outside of the one or more RRM MGs, e.g., the UE may be configured to hold the PRS measurement data and wait for the one or more RRM MGs to come and then do the processing for the PRS measurement data. In some examples, the UE may use multiple RRM MGs for processing the PRS measurement data for one PRS measurement occasion. As such, the UE may also be configured not to request a processing gap for the one or more PRSs from the base station.

On the other hand, if the UE determines that the processing availability in the one or more RRM MGs is not sufficient to process the one or more PRSs, the UE may be configured to request a PRS processing gap from the base station for processing the one or more PRSs. Then, the UE may hold the PRS measurement data, wait for the one or more RRM MGs and the requested PRS processing gap to come and then do the processing for the PRS measurement data. Ins some examples, the UE may use multiple RRM MGs and/or PRS processing gaps for processing the PRS measurement data for one PRS measurement occasion. In another example, the UE may further request the base station to align the PRS processing gap to an RRM MG, such that the UE may process the PRS measurement data via the RRM MG and a PRS measurement gap without interruption. In other words, the PRS processing gap may be aligned with existing RRM MGs or may be independently scheduled.

Figure 12:
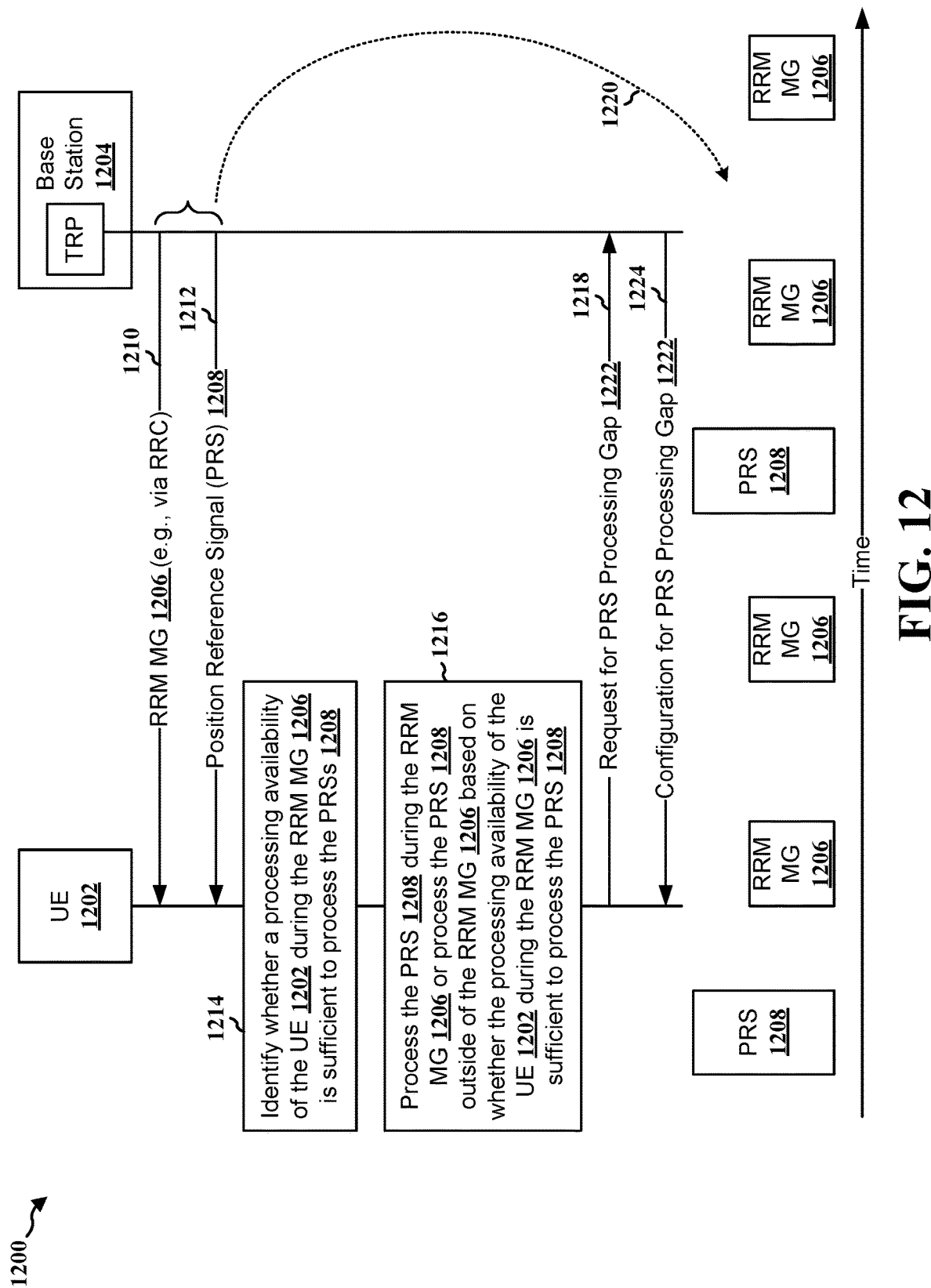
FIG. 12 is a communication flow illustrating an example of a UE utilizing RRM MG(s) for processing PRS(s) in accordance with various aspects of the present disclosure.

FIG. 12 is a communication flow 1200 illustrating an example of a UE utilizing RRM MG(s) for processing PRS(s) in accordance with various aspects of the present disclosure. The numberings associated with the communication flow 1200 do not specify a particular temporal order and are merely used as references for the communication flow 1200.

At 1210, a UE 1202 may receive a configuration for one or more RRM MGs 1206 (or for an RRM MG pattern for the one or more RRM MGs 1206) from a base station 1204, where the UE 1202 may use the one or more RRM MGs 1206 to retune its RF module to adopt a different frequency and/or RAT, etc.

At 1212, the UE 1202 may receive one or more PRSs 1208 from the base station 1204. The one or more PRSs 1208 may be associated with a UE positioning session (e.g., configured by an LMF), and the UE 1202 may receive the one or more PRSs 1208 at least prior to some of the one or more RRM MGs 1206, such as shown at 1220.

At 1214, the UE 1202 may identify whether a processing availability of the UE 1202 during the one or more RRM MGs 1206 is sufficient to process the one or more PRSs 1208. For example, if the UE 1202 is using 25% of its available processing resources (e.g., based on amount of CPU processing, amount of time, etc.) during the one or more RRM MGs 1206 (e.g., for RF retuning and/or neighbor cell measurement, etc.), the UE 1202 may have 75% of available processing resources left for other tasks. The UE 1202 may also determine an amount of processing resources specified for processing the one or more PRSs 1208. For example, the UE 1202 may be specified to use 60% of its available processing resources for processing the one or more PRSs 1208.

At 1216, based at least in part on whether there is sufficient processing availability during the one or more RRM MGs 1206 to process the one or more PRSs 1208, the UE 1202 may determine whether to process the one or more PRSs 1208 during the one or more RRM MGs 1206 and whether to request at least one PRS processing gap from the base station 1204.

Figure 13:
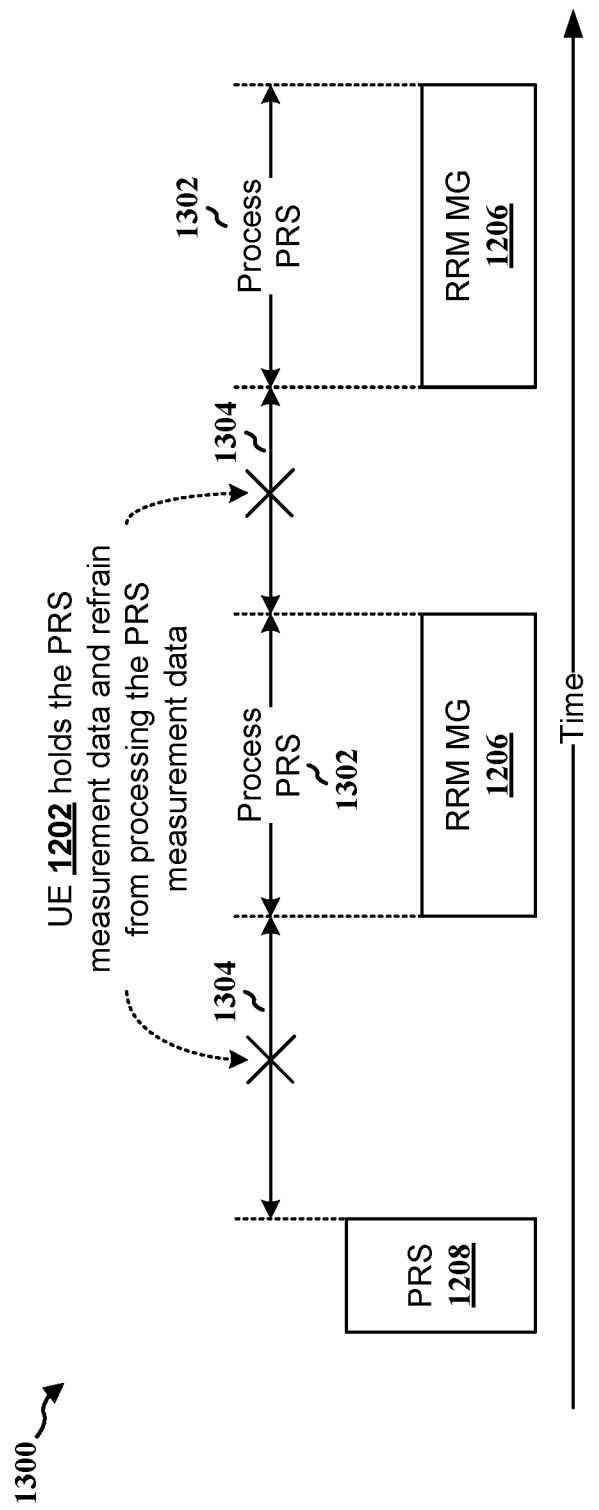
FIG. 13 is a diagram illustrating an example of processing PRS measurement data within RRM measurement gaps in accordance with various aspects of the present disclosure.

In one aspect of the present disclosure, if the UE 1202 determines that there is sufficient processing availability during the one or more RRM MGs 1206 to process the one or more PRSs 1208, the UE 1202 may process one or more PRSs 1208 during the one or more RRM MGs 1206 without requesting a PRS processing gap (e.g., or an additional time gap) from the base station 1204. For example, as shown by a diagram 1300 of FIG. 13, the UE 1202 may process the one or more PRSs 1208 during the one or more RRM MGs 1206, such as shown at 1302. In addition, the UE 1202 may be refrained from processing the one or more PRSs 1208 outside of the one or more RRM MGs 1206, e.g., the UE 1202 may be configured to hold the PRS measurement data for the one or more PRSs 1208 and wait for the one or more RRM MGs 1206 to come and then do the processing for the PRS measurement data during the one or more RRM MGs 1206, such as shown at 1304. In some examples, the UE 1202 may use more than one RRM MG for processing the PRS measurement data for one PRS measurement occasion. Thus, when there is sufficient processing availability during the one or more RRM MGs 1206 to process the one or more PRSs 1208, the UE may not specify or request a PRS processing gap or an additional processing gap from the base station 1204.

In another aspect of the present disclosure, if the UE 1202 determines that there is insufficient processing availability during the one or more RRM MGs 1206 to process the one or more PRSs 1208, as shown at 1218, the UE 1202 may be configured to request, from the base station 1204, at least one PRS processing gap 1222 (or an additional time gap) for processing the one or more PRSs 1208. In response, as shown at 1224, the base station 1204 may configure the UE 1202 with at least one PRS processing gap 1222.

Then, as shown by diagrams 1400A and 1400B of FIGS. 14A and 14B, the UE 1202 may hold the PRS measurement data for the one or more PRSs 1208, wait for the one or more RRM MGs 1206 and the requested PRS processing gap 1222 to come and then do the processing for the PRS measurement data during the one or more RRM MGs 1206 the requested PRS processing gap 1222. Similarly, in some scenarios, the UE 1202 may use multiple RRM MGs and/or multiple PRS processing gaps for processing the PRS measurement data for one PRS measurement occasion. In addition, the UE 1202 may be refrained from processing the one or more PRSs 1208 outside of the one or more RRM MGs 1206 and outside of the PRS processing gap 1222.

In one example, the UE 1202 may further request the base station 1204 to align the PRS processing gap 1222 to the one or more RRM MGs 1206, such as shown at 1404 of FIG. 14B. Thus, the UE 1202 may process the PRS measurement data via the one or more RRM MGs 1206 (or some of the one or more RRM MGs 1206) and the PRS measurement gap 1222 without interruption. In another example, as shown at 1402 of FIG. 14A, the PRS processing gap 1222 may be independently scheduled, which may not be aligned with the one or more RRM MGs 1206 and/or may overlap with at least one of the one or more RRM MGs 1206, etc.

As such, aspects presented herein may efficiently reduce a number of PRS processing gaps specified by a UE for processing a PRS by enabling the UE to utilize at least a portion of the RRM MG(s) to process the PRS, thereby improving the resource usage and performance associated with a UE positioning session.

Figure 15:
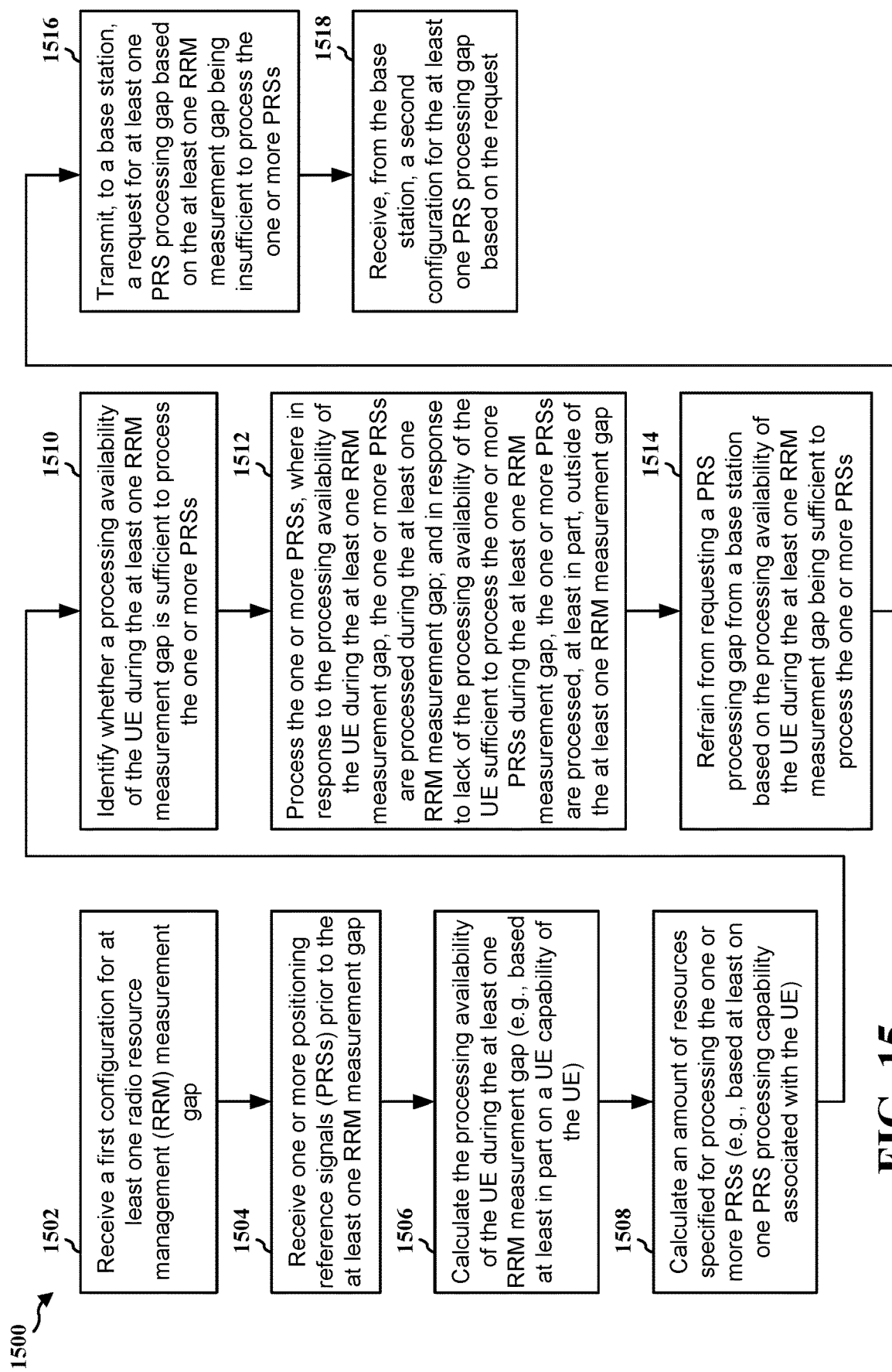
FIG. 15 is a flowchart of a method of wireless communication in accordance with aspects presented herein.

FIG. 15 is a flowchart 1500 of a method of wireless communication. The method may be performed by a UE or a component of a UE (e.g., the UE 104, 350, 404, 602, 802, 804, 806, 1002, 1202; the apparatus 1702; a processing system, which may include the memory 360 and which may be the entire UE 350 or a component of the UE 350, such as the TX processor 368, the RX processor 356, and/or the controller/processor 359). The method may enable the UE to utilize one or more RRM MGs to process a PRS based on one or more conditions, such that the UE may process the PRS without requesting a processing gap for the PRS from a serving base station.

At 1502, the UE may receive a first configuration for at least one RRM measurement gap, such as described in connection with FIG. 12. For example, at 1210, the UE 1202 may receive a configuration for one or more RRM MGs 1206 from the base station 1204 via an RRC message. The reception of the first configuration for at least one RRM measurement gap may be performed by, e.g., the RRM measurement gap process component 1740 and/or the reception component 1730 of the apparatus 1702 in FIG. 17. In some examples, each of the at least one RRM measurement gap may be between 40 to 80 milliseconds in duration.

At 1504, the UE may receive one or more PRSs prior to the at least one RRM measurement gap, such as described in connection with FIG. 12. For example, at 1212, the UE 1202 may receive one or more PRSs 1212 prior to the one or more RRM MGs 1206. The reception of the one or more PRSs may be performed by, e.g., the PRS measurement component 1742 and/or the reception component 1730 of the apparatus 1702 in FIG. 17.

In one example, the one or more PRSs may be received from at least one TRP. Similarly, the first configuration for the at least one RRM measurement gap may be received from at least one TRP.

At 1506, the UE may calculate the processing availability of the UE during the at least one RRM measurement gap based at least in part on a UE capability of the UE, such as described in connection with FIG. 12. The calculation of the processing availability may be performed by, e.g., the processing availability calculation component 1748 of the apparatus 1702 in FIG. 17.

At 1508, the UE may calculate an amount of resources specified for processing the one or more PRSs based at least on one PRS processing capability associated with the UE, such as described in connection with FIG. 12. The calculation of the amount of resources specified for processing the one or more PRSs may be performed by, e.g., the PRS resource calculation component 1750 of the apparatus 1702 in FIG. 17.

At 1510, the UE may identify whether a processing availability of the UE during the at least one RRM measurement gap is sufficient to process the one or more PRSs, such as described in connection with FIG. 12. For example, at 1214, the UE 1202 may identify whether a processing availability of the UE 1202 during the RRM MG 1206 is sufficient to process the PRSs 1208. The identification of whether the processing availability of the UE during the at least one RRM measurement gap is sufficient to process the one or more PRSs may be performed by, e.g., the processing availability determination component 1744 of the apparatus 1702 in FIG. 17.

In one example, to identify whether the processing availability of the UE during the at least one RRM measurement gap is sufficient to process the one or more PRSs, the UE may calculate a percentage of the processing availability of the UE during the at least one RRM measurement gap based on one or more measurement objects configured for the at least one RRM measurement gap.

At 1512, the UE may process the one or more PRSs, where: in response to the processing availability of the UE during the at least one RRM measurement gap, the one or more PRSs are processed during the at least one RRM measurement gap; and in response to lack of the processing availability of the UE sufficient to process the one or more PRSs during the at least one RRM measurement gap, the one or more PRSs are processed, at least in part, outside of the at least one RRM measurement gap, such as described in connection with FIG. 12. For example, at 1216, the UE 1202 may process the PRS 1208 during the RRM MG 1206 or process the PRS 1208 outside of the RRM MG 1206 based on whether the processing availability of the UE 1202 during the RRM MG 1206 is sufficient to process the PRS 1208. The process of the one or more PRSs may be performed by, e.g., the PRS process component 1746 and/or the reception component 1730 of the apparatus 1702 in FIG. 17. In one example, in response to receiving the one or more PRSs at a PRS measurement window that does not overlap with the at least one RRM measurement gap (e.g., the one or more PRSs and the at least one RRM measurement gap are at different locations), the UE may hold processing the one or more PRSs outside of the at least one RRM measurement gap.

At 1514, the UE may refrain from requesting a PRS processing gap from a base station based on the processing availability of the UE during the at least one RRM measurement gap being sufficient to process the one or more PRSs, such as described in connection with FIG. 12. The refrainment of requesting a PRS processing gap may be performed by, e.g., the processing gap request component 1752 of the apparatus 1702 in FIG. 17.

At 1516, the UE may transmit, to a base station, a request for at least one PRS processing gap based on the at least one RRM measurement gap being insufficient to process the one or more PRSs, such as described in connection with FIG. 12. For example, at 1218, the UE 1202 may transmit, to the base station 1204, a request for at least one PRS processing gap 1222. The transmission of the request for at least one PRS processing gap may be performed by, e.g., the processing gap request component 1752 and/or the transmission component 1734 of the apparatus 1702 in FIG. 17.

At 1518, the UE may receive, from the base station, a second configuration for the at least one PRS processing gap based on the request, such as described in connection with FIG. 12. For example, at 1224, the UE 1202 may receive a configuration from the base station 1204 configuring at least one PRS processing gap 1222. The reception of the second configuration for the at least one PRS processing gap may be performed by, e.g., the processing gap process component 1754 and/or the reception component 1730 of the apparatus 1702 in FIG. 17.

In one example, the request for at least one PRS processing gap may further indicate the base station to align the at least one PRS processing gap with the at least one RRM measurement gap, and the second configuration may align the at least one PRS processing gap with the at least one RRM measurement gap.

Figure 16:
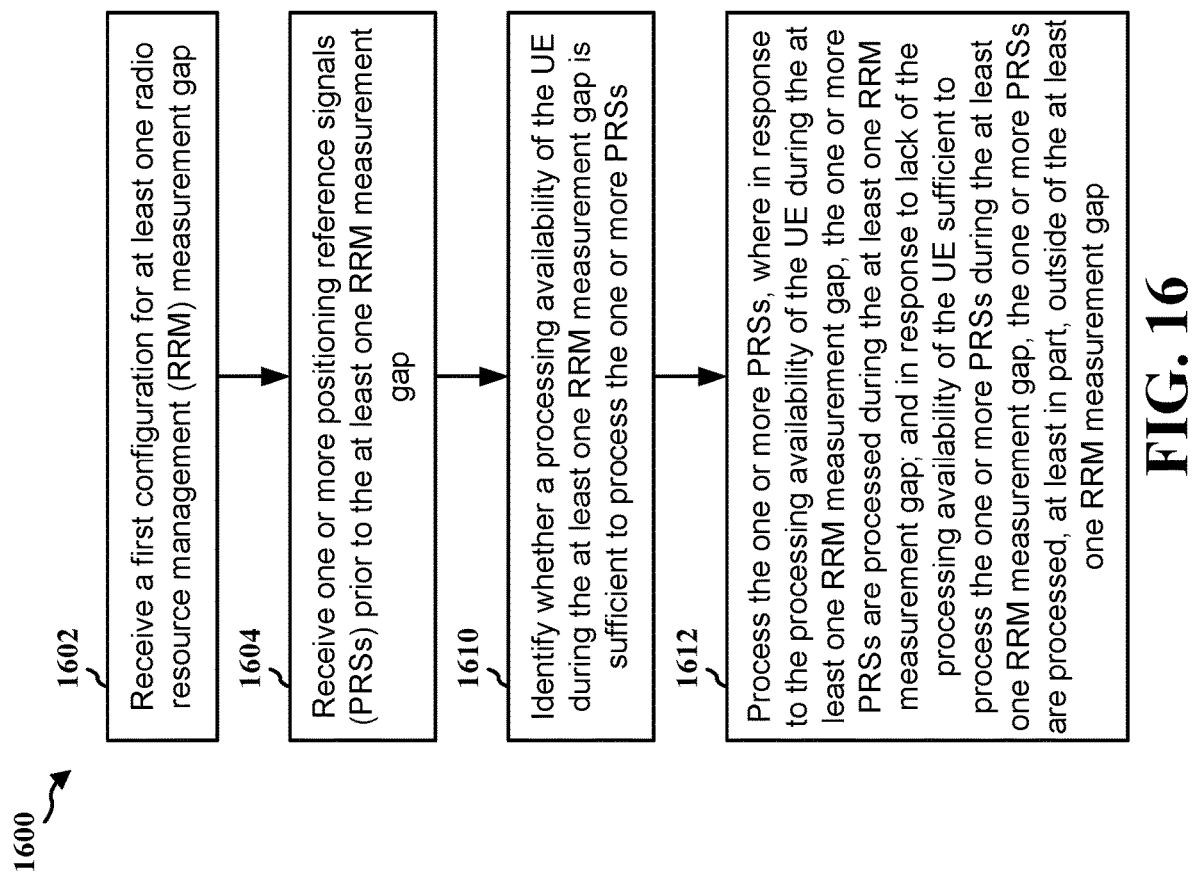
FIG. 16 is a flowchart of a method of wireless communication in accordance with aspects presented herein.

FIG. 16 is a flowchart 1600 of a method of wireless communication. The method may be performed by a UE or a component of a UE (e.g., the UE 104, 350, 404, 602, 802, 804, 806, 1002, 1202; the apparatus 1702; a processing system, which may include the memory 360 and which may be the entire UE 350 or a component of the UE 350, such as the TX processor 368, the RX processor 356, and/or the controller/processor 359). The method may enable the UE to utilize one or more RRM MGs to process a PRS based on one or more conditions, such that the UE may process the PRS without requesting a processing gap for the PRS from a serving base station.

At 1602, the UE may receive a first configuration for at least one RRM measurement gap, such as described in connection with FIG. 12. For example, at 1210, the UE 1202 may receive a configuration for one or more RRM MGs 1206 from the base station 1204 via an RRC message. The reception of the first configuration for at least one RRM measurement gap may be performed by, e.g., the RRM measurement gap process component 1740 and/or the reception component 1730 of the apparatus 1702 in FIG. 17. In some examples, each of the at least one RRM measurement gap may be between 40 to 80 milliseconds in duration.

At 1604, the UE may receive one or more PRSs prior to the at least one RRM measurement gap, such as described in connection with FIG. 12. For example, at 1212, the UE 1202 may receive one or more PRSs 1212 prior to the one or more RRM MGs 1206. The reception of the one or more PRSs may be performed by, e.g., the PRS measurement component 1742 and/or the reception component 1730 of the apparatus 1702 in FIG. 17.

In one example, the one or more PRSs may be received from a base station or at least one TRP. Similarly, the first configuration for the at least one RRM measurement gap may be received from a base station or at least one TRP.

In another example, the UE may calculate the processing availability of the UE during the at least one RRM measurement gap based at least in part on a UE capability of the UE, such as described in connection with FIG. 12. The calculation of the processing availability may be performed by, e.g., the processing availability calculation component 1748 of the apparatus 1702 in FIG. 17.

In another example, the UE may calculate an amount of resources specified for processing the one or more PRSs based at least on one PRS processing capability associated with the UE, such as described in connection with FIG. 12. The calculation of the amount of resources specified for processing the one or more PRSs may be performed by, e.g., the PRS resource calculation component 1750 of the apparatus 1702 in FIG. 17.

At 1610, the UE may identify whether a processing availability of the UE during the at least one RRM measurement gap is sufficient to process the one or more PRSs, such as described in connection with FIG. 12. For example, at 1214, the UE 1202 may identify whether a processing availability of the UE 1202 during the RRM MG 1206 is sufficient to process the PRSs 1208. The identification of whether the processing availability of the UE during the at least one RRM measurement gap is sufficient to process the one or more PRSs may be performed by, e.g., the processing availability determination component 1744 of the apparatus 1702 in FIG. 17.

In one example, to identify whether the processing availability of the UE during the at least one RRM measurement gap is sufficient to process the one or more PRSs, the UE may calculate a percentage of the processing availability of the UE during the at least one RRM measurement gap based on one or more measurement objects configured for the at least one RRM measurement gap.

At 1612, the UE may process the one or more PRSs, wherein: in response to the processing availability of the UE during the at least one RRM measurement gap, the one or more PRSs are processed during the at least one RRM measurement gap; and in response to lack of the processing availability of the UE sufficient to process the one or more PRSs during the at least one RRM measurement gap, the one or more PRSs are processed, at least in part, outside of the at least one RRM measurement gap, such as described in connection with FIG. 12. For example, at 1216, the UE 1202 may process the PRS 1208 during the RRM MG 1206 or process the PRS 1208 outside of the RRM MG 1206 based on whether the processing availability of the UE 1202 during the RRM MG 1206 is sufficient to process the PRS 1208. The process of the one or more PRSs may be performed by, e.g., the PRS process component 1746 and/or the reception component 1730 of the apparatus 1702 in FIG. 17. In one example, in response to receiving the one or more PRSs at a PRS measurement window that does not overlap with the at least one RRM measurement gap (e.g., the one or more PRSs and the at least one RRM measurement gap are at different locations), the UE may hold processing the one or more PRSs outside of the at least one RRM measurement gap.

In one example, the UE may refrain from requesting a PRS processing gap from a base station based on the processing availability of the UE during the at least one RRM measurement gap being sufficient to process the one or more PRSs, such as described in connection with FIG. 12. The refrainment of requesting a PRS processing gap may be performed by, e.g., the processing gap request component 1752 of the apparatus 1702 in FIG. 17.

In another example, the UE may transmit, to a base station, a request for at least one PRS processing gap based on the at least one RRM measurement gap being insufficient to process the one or more PRSs, such as described in connection with FIG. 12. For example, at 1218, the UE 1202 may transmit, to the base station 1204, a request for at least one PRS processing gap 1222. The transmission of the request for at least one PRS processing gap may be performed by, e.g., the processing gap request component 1752 and/or the transmission component 1734 of the apparatus 1702 in FIG. 17.

In another example, the UE may receive, from the base station, a second configuration for the at least one PRS processing gap based on the request, such as described in connection with FIG. 12. For example, at 1224, the UE 1202 may receive a configuration from the base station 1204 configuring at least one PRS processing gap 1222. The reception of the second configuration for the at least one PRS processing gap may be performed by, e.g., the process-ing gap process component 1754 and/or the reception component 1730 of the apparatus 1702 in FIG. 17.

In another example, the request for at least one PRS processing gap may further indicate the base station to align the at least one PRS processing gap with the at least one RRM measurement gap, and the second configuration may align the at least one PRS processing gap with the at least one RRM measurement gap.

Figure 17:
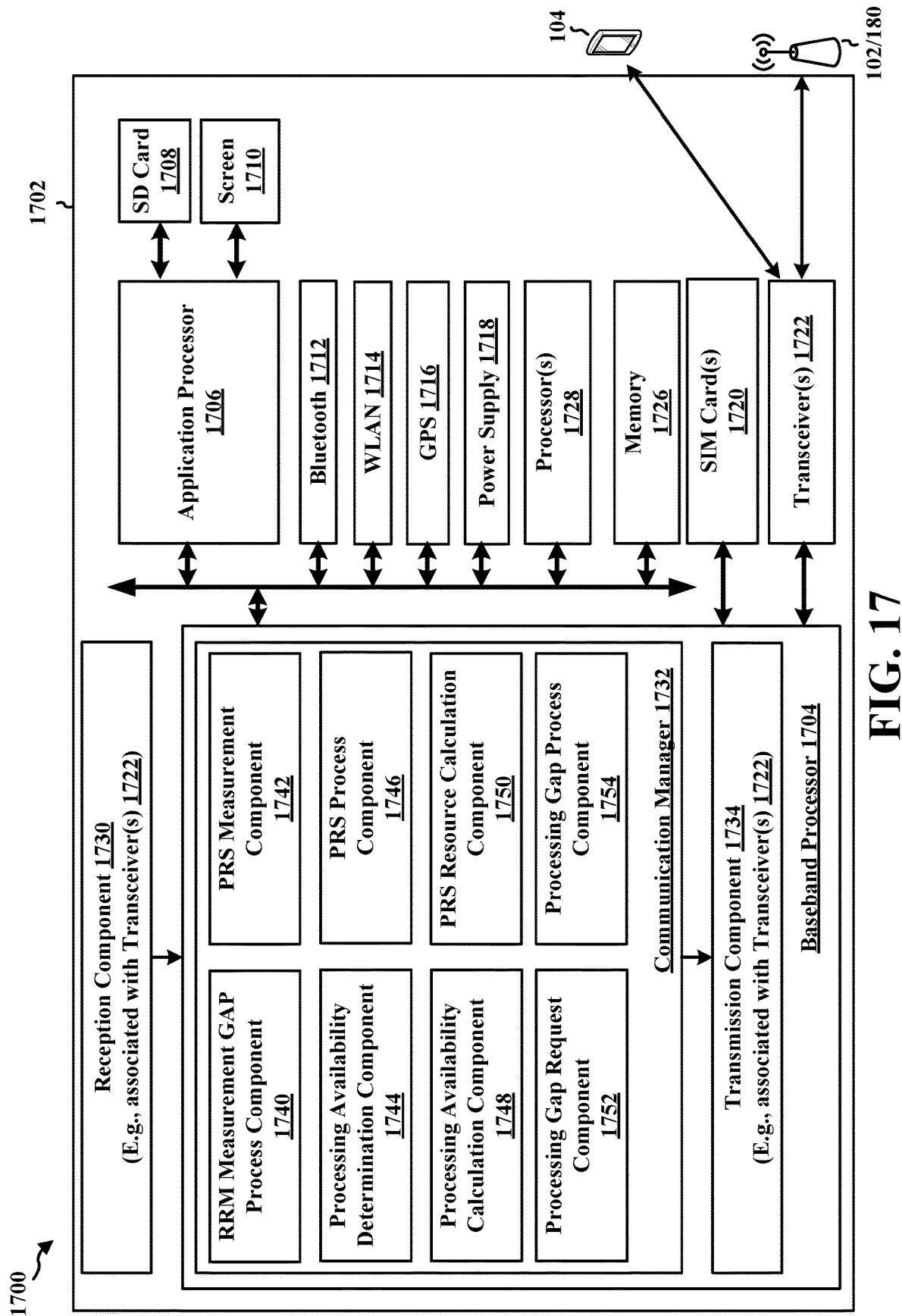
FIG. 17 is a diagram illustrating an example of a hardware implementation for an example apparatus in accordance with aspects presented herein.

FIG. 17 is a diagram 1700 illustrating an example of a hardware implementation for an apparatus 1702. The apparatus 1702 may be a UE, a component of a UE, or may implement UE functionality. In some aspects, the apparatus 1702 may include a baseband processor 1704 (also referred to as a modem) coupled to at least one transceiver 1722 (e.g., one or more RF transceivers and/or antennas). The at least one transceiver 1722 may be associated with or include a reception component 1730 and/or a transmission component 1734. In some aspects, the apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, or a power supply 1718. The baseband processor 1704 communicates through the at least one transceiver 1722 with the UE 104 and/or BS 102/180. The baseband processor 1704 may include a computer-readable medium/memory (e.g., a memory 1726). The computer-readable medium/memory may be non-transitory. The baseband processor 1704 and/or at least one processor 1728 is responsible for general processing, including the execution of software stored on the computer-readable medium/memory. The software, when executed by the baseband processor 1704 and/or the at least one processor 1728, causes the baseband processor 1704 and/or the at least one processor 1728 to perform the various functions described supra. The computer-readable medium/memory may also be used for storing data that is manipulated by the baseband processor 1704 when executing software. The baseband processor 1704 further includes the reception component 1730, a communication manager 1732, and the transmission component 1734. The reception component 1730 and the transmission component 1734 may, in a non-limiting example, include at least one transceiver and/or at least one antenna subsystem. The communication manager 1732 includes the one or more illustrated components. The components within the communication manager 1732 may be stored in the computer-readable medium/memory and/or configured as hardware within the baseband processor 1704. The baseband processor 1704 may be a component of the UE 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the additional modules of the apparatus 1702.

The communication manager 1732 includes an RRM measurement gap process component 1740 that is configured to receive a first configuration for at least one RRM measurement gap, e.g., as described in connection with 1502 of FIGS. 15 and/or 1602 of FIG. 16. The communication manager 1732 further includes a PRS measurement component 1742 that is configured to receive one or more PRSs prior to the at least one RRM measurement gap, e.g., as described in connection with 1504 of FIGS. 15 and/or 1604 of FIG. 16. The communication manager 1732 further includes a processing availability determination component 1744 that is configured to identify whether a processing availability of the UE during the at least one RRM measurement gap is sufficient to process the one or more PRSs, e.g., as described in connection with 1510 of FIGS. 15 and/or 1610 of FIG. 16. The communication manager 1732 further includes a PRS process component 1746 that is configured to process the one or more PRSs, where: in response to the processing availability of the UE during the at least one RRM measurement gap, the one or more PRSs are processed during the at least one RRM measurement gap; and in response to lack of the processing availability of the UE sufficient to process the one or more PRSs during the at least one RRM measurement gap, the one or more PRSs are processed, at least in part, outside of the at least one RRM measurement gap, e.g., as described in connection with 1512 of FIGS. 15 and/or 1612 of FIG. 16. The communication manager 1732 further includes a processing availability calculation component 1748 that is configured to calculate the processing availability of the UE during the at least one RRM measurement gap based at least in part on a UE capability of the UE, e.g., as described in connection with 1506 of FIG. 15. The communication manager 1732 further includes a PRS resource calculation component 1750 that is configured to calculate an amount of resources specified for processing the one or more PRSs based at least on one PRS processing capability associated with the UE, e.g., as described in connection with 1508 of FIG. 15. The communication manager 1732 further includes a processing gap request component 1752 that is configured to refrain from requesting a PRS processing gap from a base station based on the processing availability of the UE during the at least one RRM measurement gap being sufficient to process the one or more PRSs, e.g., as described in connection with 1514 of FIG. 15. The processing gap request component 1752 may also be configured to transmit, to a base station, a request for at least one PRS processing gap based on the at least one RRM measurement gap being insufficient to process the one or more PRSs, e.g., as described in connection with 1516 of FIG. 15. The communication manager 1732 further includes a processing gap process component 1754 that is configured to receive, from the base station, a second configuration for the at least one PRS processing gap based on the request, e.g., as described in connection with 1508 of FIG. 15.

The apparatus may include additional components that perform each of the blocks of the algorithm in the flowcharts of FIGS. 15 and 16. As such, each block in the flowcharts of FIGS. 15 and 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband processor 1704, includes means for receiving a first configuration for at least one RRM measurement gap (e.g., the RRM measurement gap process component 1740 and/or the reception component 1730). The apparatus 1702 includes means for receiving one or more PRSs prior to the at least one RRM measurement gap (e.g., the PRS measurement component 1742 and/or the reception component 1730). The apparatus 1702 includes means for identifying whether a processing availability of the UE during the at least one RRM measurement gap is sufficient to process the one or more PRSs (e.g., the processing availability determination component 1744). The apparatus 1702 includes means for processing the one or more PRSs, where in response to the processing availability of the UE during the at least one RRM measurement gap, the one or more PRSs are processed during the at least one RRM measurement gap, and in response to lack of the processing availability of the UE sufficient to process the one or more PRSs during the at least one RRM measurement gap, the one or more PRSs are processed, at least in part, outside of the at least one RRM measurement gap (e.g., the PRS process component 1746 and/or the reception component 1730). The apparatus 1702 includes means for calculating the processing availability of the UE during the at least one RRM measurement gap based at least in part on a UE capability of the UE (e.g., the processing availability calculation component 1748). The apparatus 1702 includes means for calculating an amount of resources specified for processing the one or more PRSs based at least on one PRS processing capability associated with the UE (e.g., the PRS resource calculation component 1750). The apparatus 1702 includes means for refraining from requesting a PRS processing gap from a base station based on the processing availability of the UE during the at least one RRM measurement gap being sufficient to process the one or more PRSs (e.g., the processing gap request component 1752). The apparatus 1702 includes means for transmitting, to a base station, a request for at least one PRS processing gap based on the at least one RRM measurement gap being insufficient to process the one or more PRSs (e.g., the processing gap request component 1752 and/or the transmission component 1734). The apparatus 1702 includes means for receiving, from the base station, a second configuration for the at least one PRS processing gap based on the request (e.g., the processing gap process component 1754 and/or the reception component 1730).

In one configuration, each of the at least one RRM measurement gap may be between 40 to 80 milliseconds in duration.

In another configuration, the one or more PRSs may be received from at least one TRP. Similarly, the first configuration for the at least one RRM measurement gap may be received from a base station via at least one TRP.

In another configuration, to identify whether the processing availability of the UE during the at least one RRM measurement gap is sufficient to process the one or more PRSs, the apparatus 1702 further includes means for calculating a percentage of the processing availability of the UE during the at least one RRM measurement gap based on one or more measurement objects configured for the at least one RRM measurement gap.

In another configuration, the request for at least one PRS processing gap may further indicate the base station to align the at least one PRS processing gap with the at least one RRM measurement gap, and the second configuration may align the at least one PRS processing gap with the at least one RRM measurement gap.

The means may be one or more of the components of the apparatus 1702 configured to perform the functions recited by the means. As described supra, the apparatus 1702 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 18:
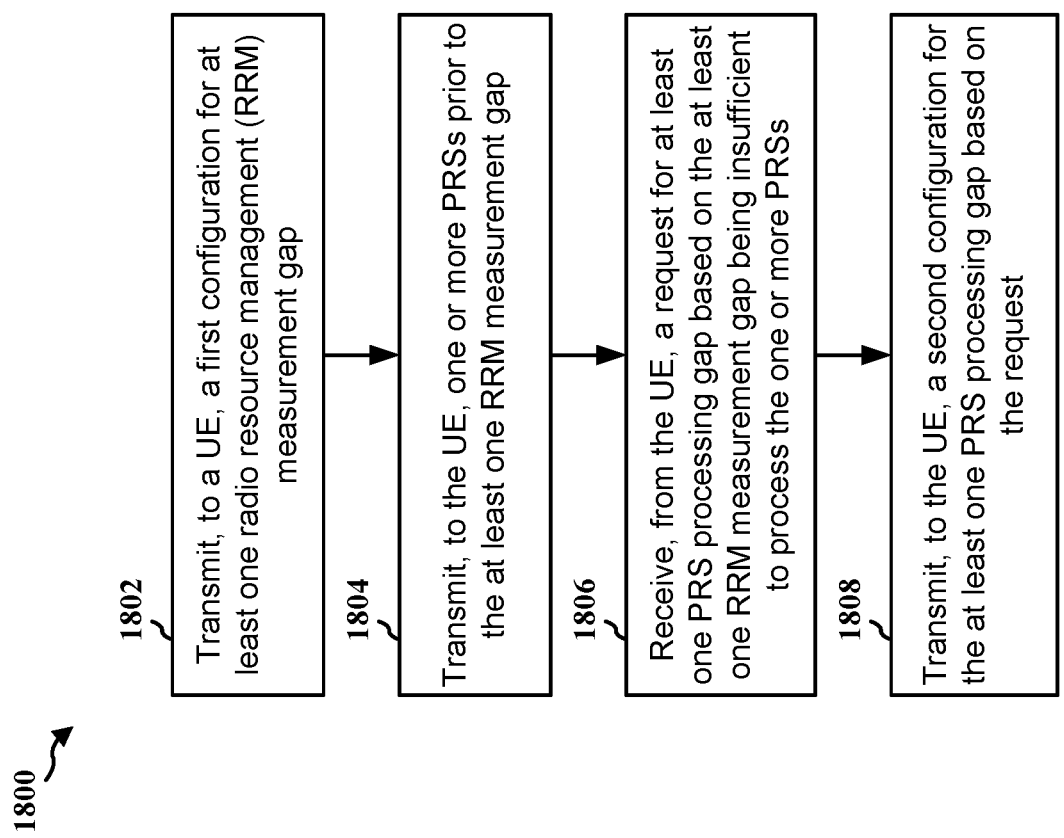
FIG. 18 is a flowchart of a method of wireless communication in accordance with aspects presented herein.

FIG. 18 is a flowchart 1800 of a method of wireless communication. The method may be performed by a base station or a component of a base station (e.g., the base station 102, 180, 310, 1004, 1204; the TRP 402, 604, 606, 608, 610, 706, 708; the apparatus 2002; a processing system, which may include the memory 376 and which may be the entire base station 310 or a component of the base station 310, such as the TX processor 316 the RX processor 370, and/or the controller/processor 375). The method may enable the base station to configure one or more PRS processing gaps for a UE based on the UE's request.

At 1802, the base station may transmit, to a UE, a first configuration for at least one RRM measurement gap, such as described in connection with FIG. 12. For example, at 1210, the base station 1204 may transmit a configuration for one or more RRM MGs 1206 to the UE 1202 via an RRC message. The transmission of the first configuration for at least one RRM measurement gap may be performed by, e.g., the RRM MG configuration component 2040 and/or the transmission component 2034 of the apparatus 2002 in FIG. 20. In one example, each of the at least one RRM measurement gap may be between 40 to 80 milliseconds in duration.

At 1804, the base station may transmit, to the UE, one or more PRSs prior to the at least one RRM measurement gap, such as described in connection with FIG. 12. For example, at 1212, the base station 1204 may transmit one or more PRSs 1208 to the UE 1202. The transmission of the one or more PRSs may be performed by, e.g., the PRS configuration component 2042 and/or the transmission component 2034 of the apparatus 2002 in FIG. 20. In one example, the one or more PRSs are transmitted to the UE via multiple TRPs.

At 1806, the base station may receive, from the UE, a request for at least one PRS processing gap based on the at least one RRM measurement gap being insufficient to process the one or more PRSs, such as described in connection with FIG. 12. For example, at 1218, the base station 1204 may receive a request for at least one PRS processing gap 1222 from the UE 1202. The reception of the request for at least one PRS processing gap may be performed by, e.g., the PRS processing gap request process component 2044 and/or the reception component 2030 of the apparatus 2002 in FIG. 20.

At 1808, the base station may transmit, to the UE, a second configuration for the at least one PRS processing gap based on the request, such as described in connection with FIG. 12. For example, at 1224, the base station 1204 may transmit a configuration for the at least one PRS processing gap 1222 to the UE 1202. The transmission of the second configuration for the at least one PRS processing gap may be performed by, e.g., the PRS processing gap configuration component 2046 and/or the transmission component 2034 of the apparatus 2002 in FIG. 20. In one example, the at least one PRS processing gap may be configured to be aligned with the at least one RRM measurement gap.

Figure 19:
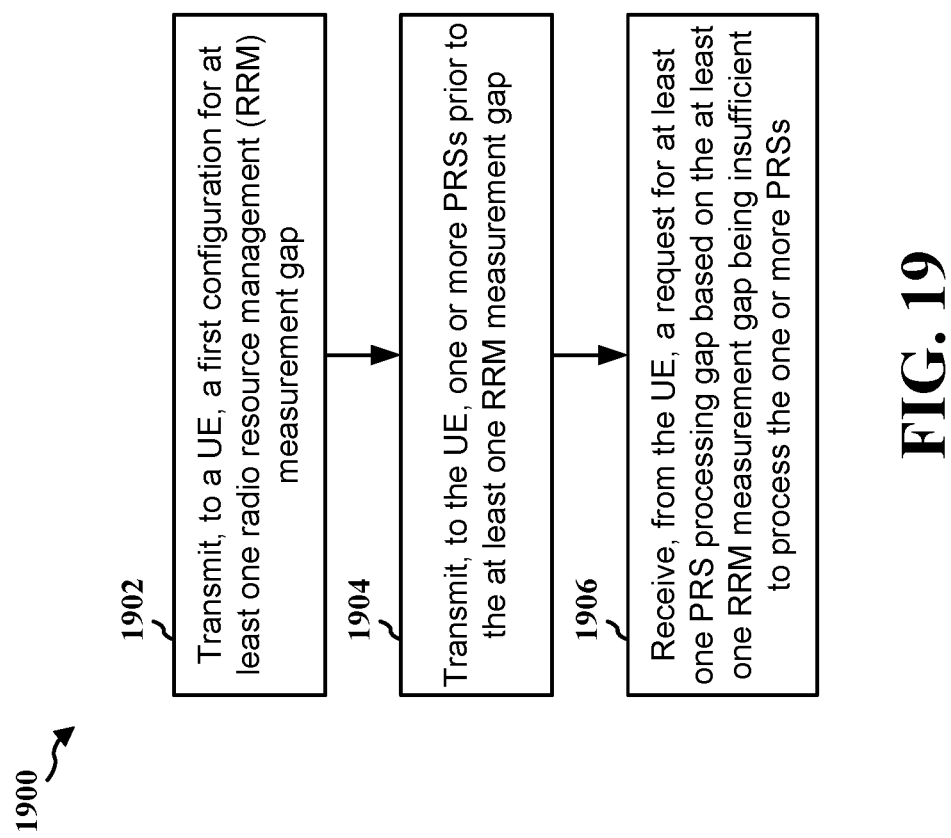
FIG. 19 is a flowchart of a method of wireless communication in accordance with aspects presented herein.

FIG. 19 is a flowchart 1900 of a method of wireless communication. The method may be performed by a base station or a component of a base station (e.g., the base station 102, 180, 310, 1004, 1204; the TRP 402, 604, 606, 608, 610, 706, 708; the apparatus 2002; a processing system, which may include the memory 376 and which may be the entire base station 310 or a component of the base station 310, such as the TX processor 316 the RX processor 370, and/or the controller/processor 375). The method may enable the base station to configure one or more PRS processing gaps for a UE based on the UE's request.

At 1902, the base station may transmit, to a UE, a first configuration for at least one RRM measurement gap, such as described in connection with FIG. 12. For example, at 1210, the base station 1204 may transmit a configuration for one or more RRM MGs 1206 to the UE 1202 via an RRC message. The transmission of the first configuration for at least one RRM measurement gap may be performed by, e.g., the RRM MG configuration component 2040 and/or the transmission component 2034 of the apparatus 2002 in FIG. 20. In one example, each of the at least one RRM measurement gap may be between 40 to 80 milliseconds in duration.

At 1904, the base station may transmit, to the UE, one or more PRSs prior to the at least one RRM measurement gap, such as described in connection with FIG. 12. For example, at 1212, the base station 1204 may transmit one or more PRSs 1208 to the UE 1202. The transmission of the one or more PRSs may be performed by, e.g., the PRS configuration component 2042 and/or the transmission component 2034 of the apparatus 2002 in FIG. 20. In one example, the one or more PRSs are transmitted to the UE via multiple TRPs.

At 1906, the base station may receive, from the UE, a request for at least one PRS processing gap based on the at least one RRM measurement gap being insufficient to process the one or more PRSs, such as described in connection with FIG. 12. For example, at 1219, the base station 1204 may receive a request for at least one PRS processing gap 1222 from the UE 1202. The reception of the request for at least one PRS processing gap may be performed by, e.g., the PRS processing gap request process component 2044 and/or the reception component 2030 of the apparatus 2002 in FIG. 20.

In one example, the base station may transmit, to the UE, a second configuration for the at least one PRS processing gap based on the request, such as described in connection with FIG. 12. For example, at 1224, the base station 1204 may transmit a configuration for the at least one PRS processing gap 1222 to the UE 1202. The transmission of the second configuration for the at least one PRS processing gap may be performed by, e.g., the PRS processing gap configuration component 2046 and/or the transmission component 2034 of the apparatus 2002 in FIG. 20. In another example, the at least one PRS processing gap may be configured to be aligned with the at least one RRM measurement gap.

Figure 20:
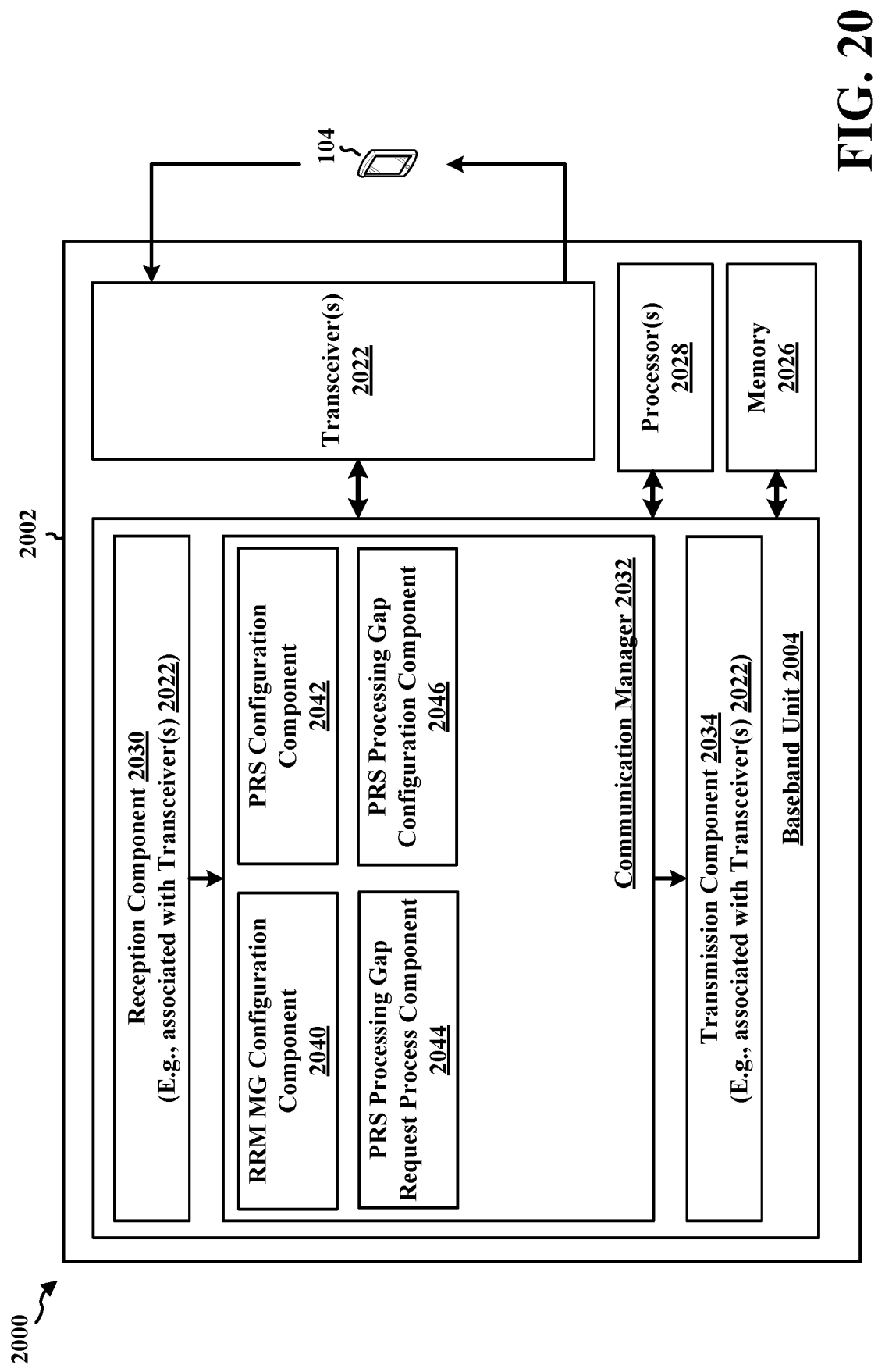
FIG. 20 is a diagram illustrating an example of a hardware implementation for an example apparatus in accordance with aspects presented herein.

FIG. 20 is a diagram 2000 illustrating an example of a hardware implementation for an apparatus 2002. The apparatus 2002 may be a base station, a component of a base station, or may implement base station functionality. In some aspects, the apparatus 2002 may include a baseband unit 2004. The baseband unit 2004 may communicate through at least one transceiver 2022 (e.g., one or more RF transceivers and/or antennas) with the UE 104. The at least one transceiver 2022 may be associated with or include a reception component 2030 and/or a transmission component 2034. The baseband unit 2004 may include a computer-readable medium/memory (e.g., a memory 2026). The baseband unit 2004 and/or the at least one processor 2028 may be responsible for general processing, including the execution of software stored on the computer-readable medium/memory. The software, when executed by the baseband unit 2004 and/or the at least one processor 2028, causes the baseband unit 2004 and/or the at least one processor 2028 to perform the various functions described supra. The computer-readable medium/memory may also be used for storing data that is manipulated by the baseband unit 2004 when executing software. The baseband unit 2004 further includes the reception component 2030, a communication manager 2032, and the transmission component 2034. The reception component 2030 and the transmission component 2034 may, in a non-limiting example, include at least one transceiver and/or at least one antenna subsystem. The communication manager 2032 includes the one or more illustrated components. The components within the communication manager 2032 may be stored in the computer-readable medium/memory and/or configured as hardware within the baseband unit 2004. The baseband unit 2004 may be a component of the base station and may include the memory 376 and/or at least one of the TX processor 316, the RX processor 370, and the controller/processor 375.

The communication manager 2032 includes an RRM MG configuration component 2040 that transmits, to a UE, a first configuration for at least one RRM measurement gap, e.g., as described in connection with 1802 of FIGS. 18 and/or 1902 of FIG. 19. The communication manager 2032 further includes a PRS configuration component 2042 that transmits, to the UE, one or more positioning reference signals (PRSs) prior to the at least one RRM measurement gap, e.g., as described in connection with 1804 of FIGS. 18 and/or 1904 of FIG. 19. The communication manager 2032 further includes a PRS processing gap request process component 2044 that receives, from the UE, a request for at least one PRS processing gap based on the at least one RRM measurement gap being insufficient to process the one or more PRSs, e.g., as described in connection with 1806 of FIGS. 18 and/or 1906 of FIG. 19. The communication manager 2032 further includes a PRS processing gap configuration component 2046 that transmits, to the UE, a second configuration for the at least one PRS processing gap based on the request, e.g., as described in connection with 1808 of FIG. 18.

The apparatus may include additional components that perform each of the blocks of the algorithm in the flowcharts of FIGS. 18 and 19. As such, each block in the flowcharts of FIGS. 18 and 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2002 may include a variety of components configured for various functions. In one configuration, the apparatus 2002, and in particular the baseband unit 2004, includes means for transmitting, to a UE, a first configuration for at least one RRM measurement gap (e.g., the RRM MG configuration component 2040 and/or the transmission component 2034). The apparatus 1602 includes means for transmitting, to the UE, one or more positioning reference signals (PRSs) prior to the at least one RRM measurement gap (e.g., the PRS configuration component 2042 and/or the transmission component 2034). The apparatus 1602 includes means for receiving, from the UE, a request for at least one PRS processing gap based on the at least one RRM measurement gap being insufficient to process the one or more PRSs (e.g., the PRS processing gap request process component 2044 and/or the reception component 2030). The apparatus 1602 includes means for transmitting, to the UE, a second configuration for the at least one PRS processing gap based on the request (e.g., the PRS processing gap configuration component 2046 and/or the transmission component 2034).

In one configuration, the at least one PRS processing gap may be configured to be aligned with the at least one RRM measurement gap.

The means may be one or more of the components of the apparatus 2002 configured to perform the functions recited by the means. As described supra, the apparatus 2002 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and a transceiver and configured to receive a first configuration for at least one RRM measurement gap; receive one or more PRSs prior to the at least one RRM measurement gap; identify whether a processing availability of the UE during the at least one RRM measurement gap is sufficient to process the one or more PRSs; process the one or more PRSs, wherein: in response to the processing availability of the UE during the at least one RRM measurement gap, the one or more PRSs are processed during the at least one RRM measurement gap; and in response to lack of the processing availability of the UE sufficient to process the one or more PRSs during the at least one RRM measurement gap, the one or more PRSs are processed, at least in part, outside of the at least one RRM measurement gap.

Aspect 2 is the apparatus of aspect 1, where, in response to receiving the one or more PRSs at a PRS measurement window that does not overlap with the at least one RRM measurement gap, the at least one processor is further configured to: hold processing the one or more PRSs outside of the at least one RRM measurement gap.

Aspect 3 is the apparatus of any of aspects 1 and 2, where the one or more PRSs are received from at least one TRP.

Aspect 4 is the apparatus of any of aspects 1 to 3, where the at least one processor is further configured to: calculate the processing availability of the UE during the at least one RRM measurement gap based at least in part on a UE capability of the UE.

Aspect 5 is the apparatus of any of aspects 1 to 4, where the at least one processor is further configured to: calculate an amount of resources specified for processing the one or more PRSs based at least on one PRS processing capability associated with the UE.

Aspect 6 is the apparatus of any of aspects 1 to 5, where the at least one processor is further configured to: refrain from requesting a PRS processing gap from a base station based on the processing availability of the UE during the at least one RRM measurement gap being sufficient to process the one or more PRSs.

Aspect 7 is the apparatus of any of aspects 1 to 6, where the at least one processor is further configured to: transmit, to a base station, a request for at least one PRS processing gap based on the at least one RRM measurement gap being insufficient to process the one or more PRSs.

Aspect 8 is the apparatus of any of aspects 1 to 7, where the at least one processor is further configured to: receive, from the base station, a second configuration for the at least one PRS processing gap based on the request.

Aspect 9 is the apparatus of any of aspects 1 to 8, where the request for at least one PRS processing gap further indicates the base station to align the at least one PRS processing gap with the at least one RRM measurement gap, and where the second configuration aligns the at least one PRS processing gap with the at least one RRM measurement gap.

Aspect 10 is the apparatus of any of aspects 1 to 9, where each of the at least one RRM measurement gap is between 40 to 80 milliseconds in duration.

Aspect 11 is the apparatus of any of aspects 1 to 10, where to identify whether the processing availability of the UE during the at least one RRM measurement gap is sufficient to process the one or more PRSs, the at least one processor is further configured to: calculate a percentage of the processing availability of the UE during the at least one RRM measurement gap based on one or more measurement objects configured for the at least one RRM measurement gap.

Aspect 12 is the apparatus of any of aspects 1 to 11, where the first configuration for the at least one RRM measurement gap is received from a base station or at least one TRP.

Aspect 13 is a method of wireless communication for implementing any of aspects 1 to 12.

Aspect 14 is an apparatus for wireless communication including means for implementing any of aspects 1 to 12.

Aspect 15 is a computer-readable medium storing computer executable code, where the code when executed by a processor causes the processor to implement any of aspects 1 to 12.

Aspect 16 is an apparatus for wireless communication including at least one processor coupled to a memory and a transceiver and configured to transmit, to a UE, a first configuration for at least one RRM measurement gap; transmit, to the UE, one or more PRSs prior to the at least one RRM measurement gap; and receive, from the UE, a request for at least one PRS processing gap based on the at least one RRM measurement gap being insufficient to process the one or more PRSs.

Aspect 17 is the apparatus of aspect 16, where the one or more PRSs are transmitted to the UE via multiple TRPs.

Aspect 18 is the apparatus of any of aspects 16 and 17, where the at least one processor is further configured to: transmit, to the UE, a second configuration for the at least one PRS processing gap based on the request.

Aspect 19 is the apparatus of any of aspects 16 to 18, where the at least one PRS processing gap is configured to be aligned with the at least one RRM measurement gap.

Aspect 20 is the apparatus of any of aspects 16 to 19, where each of the at least one RRM measurement gap is between 40 to 80 milliseconds in duration.

Aspect 21 is a method of wireless communication for implementing any of aspects 16 to 20.

Aspect 22 is an apparatus for wireless communication including means for implementing any of aspects 16 to 20.

Aspect 23 is a computer-readable medium storing computer executable code, where the code when executed by a processor causes the processor to implement any of aspects 16 to 20.

What is claimed is:

1. An apparatus for wireless communication at a user equipment (UE), comprising:
   a memory;
   at least one transceiver; and
   at least one processor communicatively connected to the memory and the at least one transceiver, the at least one processor configured to:
   receive a first configuration for at least one radio resource management (RRM) measurement gap;
   receive one or more positioning reference signals (PRSs) prior to the at least one RRM measurement gap;
   identify whether a processing availability of the UE during the at least one RRM measurement gap is sufficient to process the one or more PRSs; and
   process the one or more PRSs, wherein:
   in response to the processing availability of the UE during the at least one RRM measurement gap, the one or more PRSs are processed during the at least one RRM measurement gap; and
   in response to lack of the processing availability of the UE sufficient to process the one or more PRSs during the at least one RRM measurement gap, the one or more PRSs are processed, at least in part, outside of the at least one RRM measurement gap.

2. The apparatus of claim 1, wherein, in response to receiving the one or more PRSs at a PRS measurement window that does not overlap with the at least one RRM measurement gap, the at least one processor is further configured to:
hold processing the one or more PRSs outside of the at least one RRM measurement gap.

3. The apparatus of claim 1, wherein the one or more PRSs are received from at least one transmission-reception point (TRP).

4. The apparatus of claim 1, wherein the at least one processor is further configured to:
calculate the processing availability of the UE during the at least one RRM measurement gap based at least in part on a UE capability of the UE.

5. The apparatus of claim 1, wherein the at least one processor is further configured to:
calculate an amount of resources specified for processing the one or more PRSs based at least on one PRS processing capability associated with the UE.

6. The apparatus of claim 1, wherein the at least one processor is further configured to:
refrain from requesting a PRS processing gap from a base station based on the processing availability of the UE during the at least one RRM measurement gap being sufficient to process the one or more PRSs.

7. The apparatus of claim 1, wherein the at least one processor is further configured to:
transmit, to a base station, a request for at least one PRS processing gap based on the at least one RRM measurement gap being insufficient to process the one or more PRSs.

8. The apparatus of claim 7, wherein the at least one processor is further configured to:
receive, from the base station, a second configuration for the at least one PRS processing gap based on the request.

9. The apparatus of claim 8, wherein the request for the at least one PRS processing gap further indicates the base station to align the at least one PRS processing gap with the at least one RRM measurement gap, and wherein the second configuration aligns the at least one PRS processing gap with the at least one RRM measurement gap.

10. The apparatus of claim 1, wherein each of the at least one RRM measurement gap is between 40 to 80 milliseconds in duration.

11. The apparatus of claim 1, wherein to identify whether the processing availability of the UE during the at least one RRM measurement gap is sufficient to process the one or more PRSs, the at least one processor is further configured to:
calculate a percentage of the processing availability of the UE during the at least one RRM measurement gap based on one or more measurement objects configured for the at least one RRM measurement gap.

12. The apparatus of claim 1, wherein the first configuration for the at least one RRM measurement gap is received from a base station.

13. A method of wireless communication at a user equipment (UE), comprising:
receiving a first configuration for at least one radio resource management (RRM) measurement gap;
receiving one or more positioning reference signals (PRSs) prior to the at least one RRM measurement gap;
identifying whether a processing availability of the UE during the at least one RRM measurement gap is sufficient to process the one or more PRSs; and
processing the one or more PRSs, wherein:
in response to the processing availability of the UE during the at least one RRM measurement gap, the one or more PRSs are processed during the at least one RRM measurement gap; and
in response to lack of the processing availability of the UE sufficient to process the one or more PRSs during the at least one RRM measurement gap, the one or more PRSs are processed, at least in part, outside of the at least one RRM measurement gap.

14. The method of claim 13, wherein, in response to receiving the one or more PRSs at a PRS measurement window that does not overlap with the at least one RRM measurement gap, the method further comprising:
holding processing the one or more PRSs outside of the at least one RRM measurement gap.

15. The method of claim 13, wherein the one or more PRSs are received from at least one transmission-reception point (TRP).

16. The method of claim 13, further comprising:
calculating the processing availability of the UE during the at least one RRM measurement gap based at least in part on a UE capability of the UE.

17. The method of claim 13, further comprising:
calculating an amount of resources specified for processing the one or more PRSs based at least on one PRS processing capability associated with the UE.

18. The method of claim 13, further comprising:
refraining from requesting a PRS processing gap from a base station based on the processing availability of the UE during the at least one RRM measurement gap being sufficient to process the one or more PRSs.

19. The method of claim 13, further comprising:
transmitting, to a base station, a request for at least one PRS processing gap based on the at least one RRM measurement gap being insufficient to process the one or more PRSs.

20. The method of claim 19, further comprising:
receiving, from the base station, a second configuration for the at least one PRS processing gap based on the request.

21. The method of claim 20, wherein the request for the at least one PRS processing gap further indicates the base station to align the at least one PRS processing gap with the at least one RRM measurement gap, and wherein the second configuration aligns the at least one PRS processing gap with the at least one RRM measurement gap.

22. The method of claim 13, wherein each of the at least one RRM measurement gap is between 40 to 80 milliseconds in duration.

23. The method of claim 13, further comprising:
calculating a percentage of the processing availability of the UE during the at least one RRM measurement gap based on one or more measurement objects configured for the at least one RRM measurement gap.

24. The method of claim 13, wherein the first configuration for the at least one RRM measurement gap is received from a base station.

25. An apparatus for wireless communication at a base station, comprising:
a memory;
at least one transceiver; and at least one processor communicatively connected to the memory and the at least one transceiver, the at least one processor configured to:
  transmit, to a user equipment (UE), a first configuration for at least one radio resource management (RRM) measurement gap;
  transmit, to the UE, one or more positioning reference signals (PRSs) prior to the at least one RRM measurement gap; and
  receive, from the UE, a request for at least one PRS processing gap based on the at least one RRM measurement gap being insufficient to process the one or more PRSs.

26. The apparatus of claim 25, wherein the one or more PRSs are transmitted to the UE via multiple base stations or multiple transmission-reception points (TRPs).

27. The apparatus of claim 25, wherein the at least one processor is further configured to:
  transmit, to the UE, a second configuration for the at least one PRS processing gap based on the request.

28. The apparatus of claim 27, wherein the at least one PRS processing gap is configured to be aligned with the at least one RRM measurement gap.

29. The apparatus of claim 25, wherein each of the at least one RRM measurement gap is between 40 to 80 milliseconds in duration.

30. A method of wireless communication at a base station, comprising:
  transmitting, to a user equipment (UE), a first configuration for at least one radio resource management (RRM) measurement gap;
  transmitting, to the UE, one or more positioning reference signals (PRSs) prior to the at least one RRM measurement gap; and
  receiving, from the UE, a request for at least one PRS processing gap based on the at least one RRM measurement gap being insufficient to process the one or more PRSs.

* * * * *